United States Patent
Chu et al.

(10) Patent No.: US 9,215,055 B2
(45) Date of Patent: Dec. 15, 2015

(54) MEDIUM ACCESS PROTECTION AND BANDWIDTH NEGOTIATION IN A WIRELESS LOCAL AREA NETWORK

(71) Applicant: Marvell World Trade Ltd., St. Michael (BB)

(72) Inventors: Liwen Chu, San Ramon, CA (US);
Hui-Ling Lou, Sunnyvale, CA (US);
Hongyuan Zhang, Fremont, CA (US);
Yakun Sun, Sunnyvale, CA (US); Xiayu Zheng, San Jose, CA (US); Rui Cao, Fremont, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/555,305

(22) Filed: Nov. 26, 2014

(65) Prior Publication Data
US 2015/0146808 A1    May 28, 2015

Related U.S. Application Data

(60) Provisional application No. 61/987,757, filed on May 2, 2014, provisional application No. 61/909,719, filed on Nov. 27, 2013.

(51) Int. Cl.
| | |
|---|---|
| *H04K 1/10* | (2006.01) |
| *H04L 27/28* | (2006.01) |
| *H04L 5/00* | (2006.01) |
| *H04L 27/26* | (2006.01) |
| *H04L 25/02* | (2006.01) |
| *H04W 74/08* | (2009.01) |
| *H04W 84/12* | (2009.01) |

(52) U.S. Cl.
CPC ............ *H04L 5/0053* (2013.01); *H04L 5/0037* (2013.01); *H04L 5/0094* (2013.01); *H04L25/0224* (2013.01); *H04L 27/2626* (2013.01); *H04W 74/0816* (2013.01); *H04L 5/0007* (2013.01); *H04W 84/12* (2013.01)

(58) Field of Classification Search
CPC .. H04L 5/0053; H04L 27/2626; H04W 84/12
USPC .......................................................... 375/260
See application file for complete search history.

(56) References Cited

U.S. PATENT DOCUMENTS

| | | |
|---|---|---|
| 7,599,332 B2 | 10/2009 | Zelst et al. |
| 7,742,390 B2 | 6/2010 | Mujtaba |

(Continued)

FOREIGN PATENT DOCUMENTS

WO     WO-2011/130344 A1     10/2011

OTHER PUBLICATIONS

U.S. Appl. No. 14/553,974, Zhang, et al., "Orthogonal Frequency Division Multiple Access for Wireless Local Area Network."

(Continued)

*Primary Examiner* — Erin File

(57) ABSTRACT

Respective sub-channels of an OFDM channel are allocated by a first device to second devices. A first control frame, transmitted from the first device to the second devices, indicates that the second devices are requested to transmit a second control frame to the first device. Respective second control frames are received from at the first device from least some of the second devices. A second control frame received from a particular second device indicates that at least a portion of the sub-channel allocated to the second device is available. An OFDMA data unit is transmitted by the first device. The OFDMA data unit includes respective OFDM data units transmitted to the at least some of the second devices. Each OFDM data unit is transmitted to a particular second device in the portion of the sub-channel indicated to be available by the second control frame received from the second device.

30 Claims, 23 Drawing Sheets

(56) References Cited

U.S. PATENT DOCUMENTS

| | | | |
|---|---|---|---|
| 8,144,647 | B2 | 3/2012 | Nabar et al. |
| 8,149,811 | B2 | 4/2012 | Nabar et al. |
| 8,270,909 | B2 | 9/2012 | Zhang et al. |
| 8,363,578 | B1 | 1/2013 | Ramamurthy et al. |
| 8,395,997 | B2 | 3/2013 | Banerjea et al. |
| 8,472,383 | B1 | 6/2013 | Banerjea et al. |
| 8,599,803 | B1 | 12/2013 | Zhang et al. |
| 8,619,907 | B2 | 12/2013 | Mujtaba et al. |
| 8,660,497 | B1 | 2/2014 | Zhang et al. |
| 8,670,399 | B2 | 3/2014 | Liu et al. |
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,886,755 | B1 | 11/2014 | Liu et al. |
| 8,923,118 | B1 | 12/2014 | Liu et al. |
| 8,971,350 | B1 | 3/2015 | Liu |
| 2007/0060149 | A1* | 3/2007 | Lim et al. .................. 455/445 |
| 2007/0177541 | A1* | 8/2007 | Kwon et al. ................ 370/329 |
| 2007/0206534 | A1* | 9/2007 | Kwun et al. ................ 370/329 |
| 2008/0075058 | A1 | 3/2008 | Mundarath et al. |
| 2008/0084941 | A1* | 4/2008 | Mohanty et al. ............. 375/260 |
| 2008/0192644 | A1 | 8/2008 | Utsunomiya et al. |
| 2008/0292015 | A1* | 11/2008 | Lee ............................ 375/260 |
| 2009/0196163 | A1 | 8/2009 | Du |
| 2010/0046358 | A1 | 2/2010 | van Nee |
| 2010/0067589 | A1* | 3/2010 | Schumacher et al. ........ 375/260 |
| 2010/0091675 | A1 | 4/2010 | Sawai |
| 2010/0118829 | A1* | 5/2010 | Lin et al. ................... 370/330 |
| 2010/0309834 | A1 | 12/2010 | Fischer et al. |
| 2011/0002219 | A1 | 1/2011 | Kim et al. |
| 2011/0038332 | A1 | 2/2011 | Liu et al. |
| 2011/0096796 | A1 | 4/2011 | Zhang et al. |
| 2011/0096797 | A1 | 4/2011 | Zhang et al. |
| 2011/0128929 | A1 | 6/2011 | Liu et al. |
| 2011/0128947 | A1 | 6/2011 | Liu et al. |
| 2011/0310827 | A1 | 12/2011 | Srinivasa et al. |
| 2012/0082040 | A1 | 4/2012 | Gong et al. |
| 2013/0286959 | A1* | 10/2013 | Lou et al. ................... 370/329 |

OTHER PUBLICATIONS

U.S. Appl. No. 14/555,183, Zhang, et al., "Sounding and Tone Block Allocation for Orthogonal Frequency Multiple Access (OFDMA) in Wireless Local Area Networks."

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, pp. 1-1184 (Jun. 12, 2007).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-83 (Sep. 1999).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, pp. 1-92, (1999) Reaffirmed (Jun. 12, 2003).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band—Corrigendum 1," *The Institute of Electrical and Electronics Engineers, Inc.*, pp. 1-23 (Nov. 7, 2001).

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, " *The Institute of Electrical and Electronics Engineers, Inc.*, pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band, " *The Institute of Electrical and Electronics Engineers, Inc.*, pp. 1-69 (Apr. 2003).

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE P802.11n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

(56) References Cited

OTHER PUBLICATIONS

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," *Prentice Hall*, pp. 1-26 (Jul. 2003).

Hart, et al., "DL-OFDMA for Mixed Clients," IEEE 802.11-10/0317r1, 24 pages (Mar. 6, 2010).

Hiertz, et al., "The IEEE 802.11 Universe," *IEEE Communications Magazine*, pp. 62-70, (Jan. 2010).

Liu, et al., "VHT BSS Channel Selection," *Institute of Electrical and Electronics Engineers, Inc.*, doc. No. IEEE 802.11-11/1433r0, pp. 1-10 (Nov. 2011).

Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Noh, et al., "Channel Selection and Management for 11ac," Doc. No. IEEE 802.11-10/0593r1, *The Institute of Electrical and Electronics Engineers, Inc.*, pp. 1-21 (May 20, 2010).

Park, "IEEE 802.11ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia, et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).

Redieteab, et al., "Cross-Layer Multichannel Aggregation for Future WLAN Systems," 2010 IEEE Int'l Conf. on Communication Systems (ICCS), pp. 740-756 (Nov. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

van Nee, et al. "The 802.11n MIMO-OFDM Standard for Wireless LAN and Beyond," Wireless Personal Communications, vol. 37, pp. 445-453 (Jun. 2006).

Wannstrom, "Carrier Aggregation explained," pp. 1-6 (May 2012).

Yuan et al., "Carrier Aggregation for LTE-Advanced Mobile Communication Systems," *IEEE Communications Magazine*, pp. 88-93 (Feb. 2010).

Chu, et al., "Uplink Multi-User Multiple Input Multiple Output Beamforming," U.S. Appl. No. 14/554,497, filed Nov. 26, 2014 (60 pages).

Chu, et al., "Uplink Multi-User Multiple Input Multiple Output for Wireless Local Area Network," U.S. Appl. No. 14/553,982, filed Nov. 25, 2014 (47 pages).

Liu, et al, "Methods and Apparatus for Clear Channel Assessment," U.S. Appl. No. 13/034,421, filed Feb. 24, 2011 (47 pages).

Liu, et al, "Accessing Channels in a Multi-Channel Communication System," U.S. Appl. No. 13/440,214, filed Apr. 5, 2012 (38 pages).

Zhang, et al, "OFDMA with Block Tone Assignment for WLAN," U.S. Appl. No. 12/730,651, filed Mar. 24, 2010 (39 pages).

Zhang, et al., "Sounding and Tone Block Allocation for Orthogonal Frequency Multiple Access (OFDMA) in Wireless Local Area Networks," U.S. Appl. No. 14/555,183, filed Nov. 26, 2014 (57 pages).

International Search Report and Written Opinion in International Application No. PCT/US2014/067753, dated May 12, 2015 (19 pages).

Invitation to Pay Fees and Partial International Search Report for International Application No. PCT/US2014/067753, mailed Feb. 16, 2015 (7 pages).

U.S. Appl. No. 13/925,596, Banerjea et al., "Group Management in Multiuser Communications," filed Jun. 24, 2013.

U.S. Appl. No. 14/065,175, Zhang et al., "Simultaneous Uplink Transmission in a Wireless Network," filed Oct. 28, 2013.

U.S. Appl. No. 14/537,388, Liu et al., "Method and Apparatus for Facilitating Simultaneous Transmission from Multiple Stations," filed Nov. 10, 2014.

"IEEE 802.11ac: from channelization to multi-user MIMO," *IEEE Communications Magazine*, IEEE Service Center, vol. 51, No. 10, pp. 84-90 (Oct. 1, 2013).

* cited by examiner

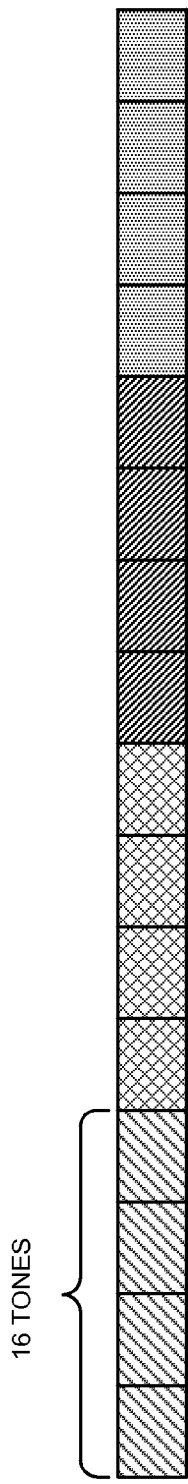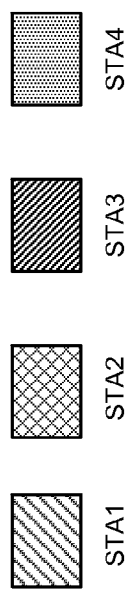

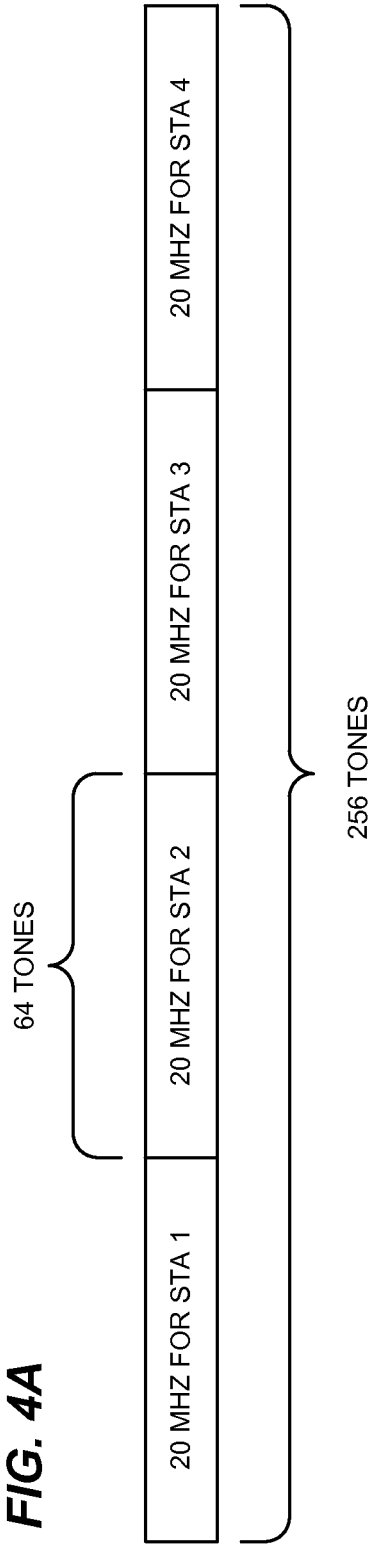
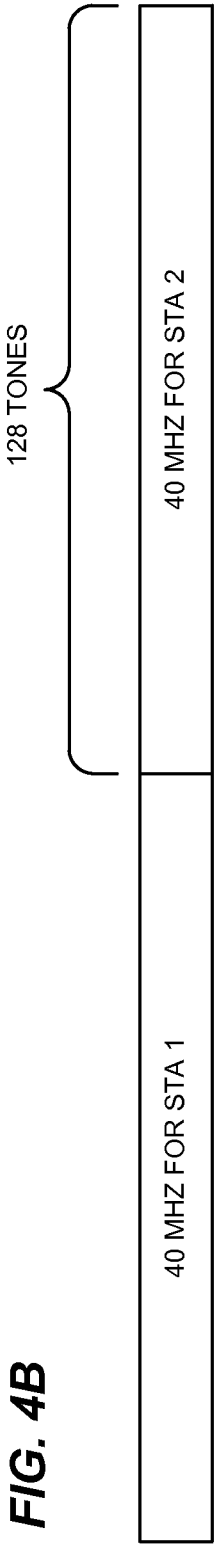
FIG. 4A
FIG. 4B

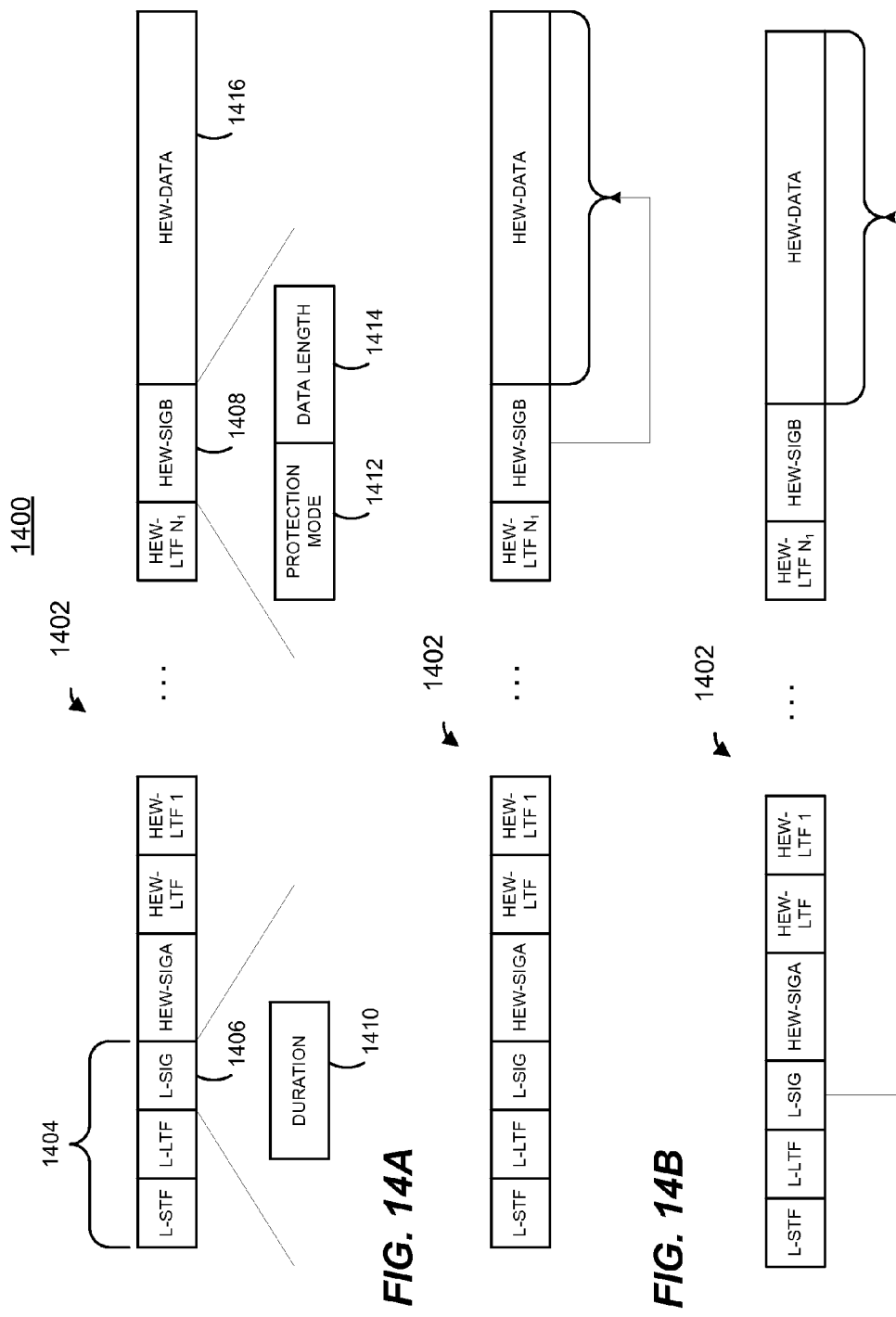

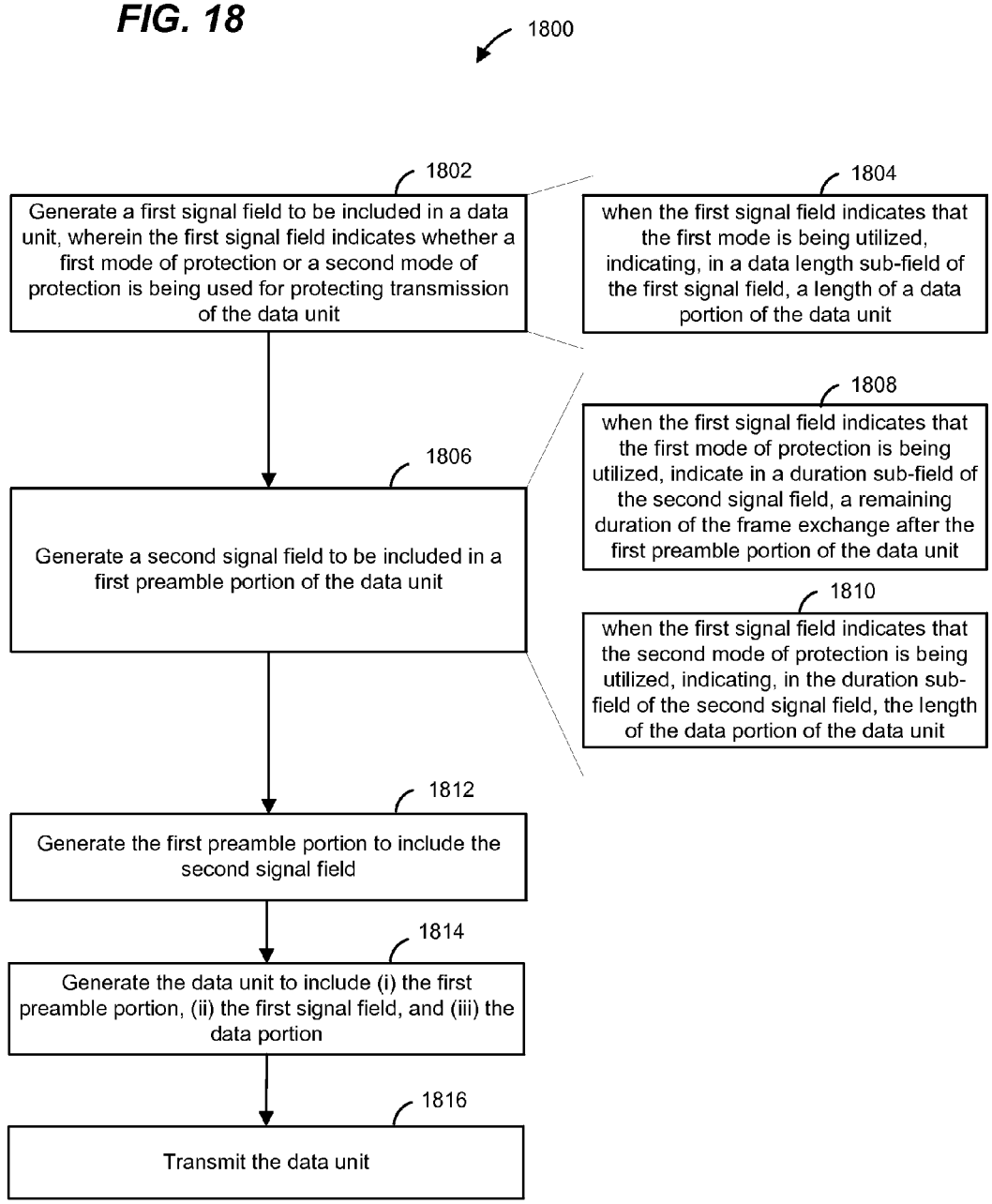

MEDIUM ACCESS PROTECTION AND BANDWIDTH NEGOTIATION IN A WIRELESS LOCAL AREA NETWORK

CROSS-REFERENCE TO RELATED APPLICATION

This disclosure claims the benefit of U.S. Provisional Patent Application No. 61/909,719, filed Nov. 27, 2013, and 61/987,757, filed May 2, 2014, both entitled "OFDMA Protection and Bandwidth Negotiation," the disclosures of which are hereby expressly incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

These WLANs operate in either a unicast mode or a multicast mode. In the unicast mode, the AP transmits information to one client station at a time. In the multicast mode, the same information is concurrently transmitted to a group of client stations.

SUMMARY

In an embodiment, a method for simultaneous communication in a wireless local area network that includes a first communication device and multiple second communication devices includes allocating, by the first communication device, respective sub-channels of an orthogonal frequency division multiplexing (OFDM) channel to two or more of the second communication devices. The method additionally includes transmitting a first control frame to the two or more second communication devices, wherein the first control frame indicates that the two or more second communication devices are requested to transmit a second control frame to the first communication device. The method further includes receiving, at the first communication device from at least some of the two or more second communication devices, respective second control frames, wherein the second control frames are transmitted by the at least some of the two or more second communication devices in the respective sub-channels allocated to the at least some of the two or more second communication devices, and wherein a second control frame transmitted by a particular second communication device indicates that at least a portion of the sub-channel allocated to the second communication device is available. The method further still includes transmitting an orthogonal frequency division multiple access (OFDMA) data unit, wherein the OFDMA data unit includes respective OFDM data units transmitted to the at least some of the two or more second communication devices, wherein each OFDM data unit is transmitted to a particular one of the second communication devices in the at least the portion of the sub-channel allocated to the second communication device and indicated to be available by the second control frame received from the second communication device.

In another embodiment, a first communication device comprises a network interface configured to allocate respective sub-channels of an orthogonal frequency division multiplexing (OFDM) channel to two or more second communication devices. The network interface is further configured to transmit a first control frame to the two or more second communication devices, wherein the first control frame indicates that the two or more second communication devices are requested to transmit a second control frame to the first communication device. The network interface is further still configured to receive, from at least some of the two or more second communication devices, respective second control frames, wherein the second control frames are transmitted by the at least some of the two or more second communication devices in the respective sub-channels allocated to the at least some of the second communication devices, and wherein a second control frame transmitted by a particular second communication device indicates that at least a portion of the sub-channel allocated to the second communication device is available. The network interface is additionally configured to transmit an orthogonal frequency division multiple access (OFDMA) data unit, wherein the OFDMA data unit includes respective OFDM data units transmitted to the at least some of the two or more second communication devices, wherein each OFDM data unit is transmitted to a particular one of the second communication devices in the at least the portion of the sub-channel allocated to the second communication device and indicated to be available by the second control frame received from the second communication device.

In yet another embodiment, a method for protection in a frame exchange between a first communication device and at least one second communication device includes generating, by a first communication device, a first signal field to be included in a data unit, wherein the first signal field indicates whether a first mode of protection or a second mode of protection is being used for protecting transmission of the data unit, including when the first signal field indicates that the first mode is being utilized, indicating, in a data length subfield of the first signal field, a length of a data portion of the data unit. The method further includes generating, by the first communication device, a second signal field to be included in a first preamble portion of the data unit. When the first signal field indicates that the first mode of protection is being utilized, generating the second signal field includes indicating in the second signal field, a remaining duration of the frame exchange after the first preamble portion of the data unit. When the first signal field indicates that the second mode of protection is being utilized, generating the second signal field includes indicating, in the second signal field, a duration indicative of the length of the data portion of the data unit. The method further includes generating, by the first communication device, the first preamble portion to include at least the second signal field, generating, by the first communication device, the data unit to include at least (i) the first preamble portion, (ii) the first signal field, and (iii) the data portion, and transmitting the data unit from the first communication device to one or more second communication devices.

In still another embodiment, a first communication device comprises a network interface configured to generate a first signal field to be included in a data unit, wherein the first signal field indicates whether a first mode of protection or a second mode of protection is being used for protecting transmission of the data unit, when the first signal field indicates that the first mode is being utilized, generating the first signal field includes indicating, in a data length sub-field of the first signal field, a length of a data portion of the data unit. The network interface is further configured to generate a second signal field to be included in a first preamble portion of the data unit. When the first signal field indicates that the first mode of protection is being utilized, generating the second signal field includes indicating in the second signal field, a remaining duration of the frame exchange after the first preamble portion of the data unit. When the first signal field indicates that the second mode of protection is being utilized, generating the second signal field includes indicating, in the second signal field, a duration indicative of the length of the data portion of the data unit. The network interface is further configured to generate the first preamble portion to include at least the second signal field, generate the data unit to include at least (i) the first preamble portion, (ii) the first signal field, and (iii) the data portion, and transmit the data unit to one or more second communication devices.

BRIEF DESCRIPTION OF THE DRAWINGS

FIGS. 3A-3C are diagrams of example channel allocation schemes, according to various embodiments.

FIGS. 4A-4D are diagrams illustrating example orthogonal frequency division multiplexing (OFDM) sub-channel blocks for a communication channel, according to an embodiment.

FIGS. 14A-14C are diagrams illustrating a protection scheme, according to an embodiment.

FIG. 18 is a flow diagram of an example method for protection in a frame exchange between a first communication device and at least one second communication device, according to an embodiment.

DETAILED DESCRIPTION

In embodiments described below, a wireless network device such as an access point (AP) of a wireless local area network (WLAN) simultaneously transmits independent data streams to multiple client stations and/or receives independent data streams simultaneously transmitted by multiple client stations. In particular, the AP transmits data for the multiple clients in different orthogonal frequency division multiplexing (OFDM) sub-channels of an orthogonal frequency division multiple access (OFDMA) transmission, in an embodiment. Similarly, multiple client stations simultaneously transmit data to the AP, in particular, each client station transmits data in a different OFDM sub-channel of an OFDMA transmission, in an embodiment.

The AP is configured to operate with client stations according to at least a first communication protocol. The first communication protocol is sometimes referred to herein as "high efficiency WiFi," "high efficiency WLAN," "HEW" communication protocol, or 802.11ax communication protocol. The first communication protocol supports OFDMA communication between the AP and the client stations. In some embodiments, different client stations in the vicinity of the AP are configured to operate according to one or more other communication protocols that define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. The legacy communication protocols do not support OFDMA communication, in an embodiment.

In an embodiment, client stations that are configured to operate according to the HEW communication protocol generally support OFDMA communication initiated by the AP. In some embodiments, client stations that are configured to operate according to the HEW communication protocol optionally support OFDMA communication initiated by the client stations.

Figure 1:
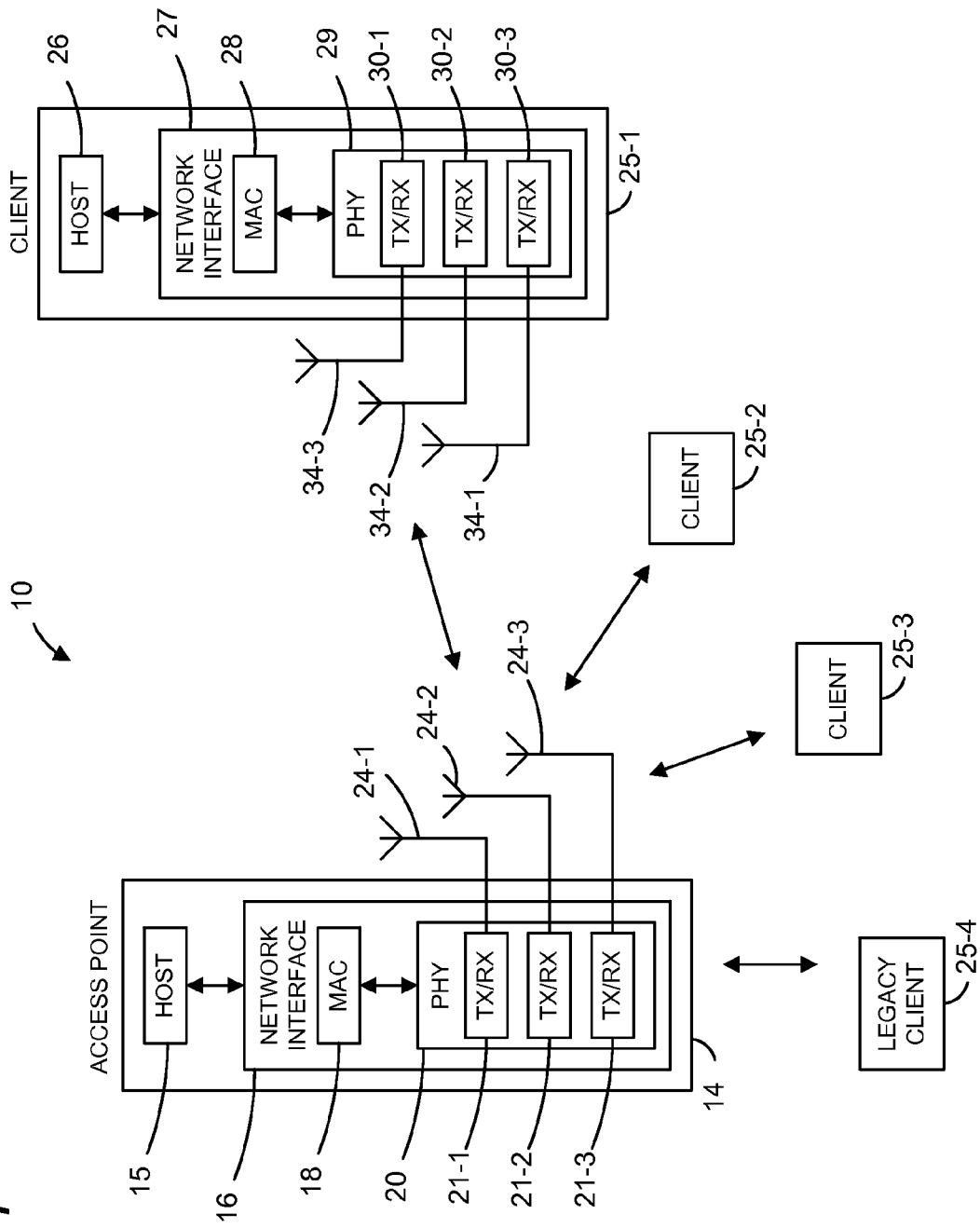
FIG. 1 is a block diagram of an example wireless local area network (WLAN), according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. Two or more of the client stations 25 are configured to receive corresponding data streams that are transmitted simultaneously by the AP 14. Additionally, two or more of the client stations 25 are configured to transmit corresponding data streams to the AP 14 such that the AP 14 receives the data streams simultaneously.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

According to an embodiment, the client station 25-4 is a legacy client station that is not enabled to receive a data stream that is transmitted by the AP 14 simultaneously with other independent data streams as part of an OFDMA transmission to multiple client stations 25. Similarly, according to an embodiment, the legacy client station 25-4 is not enabled to transmit a data stream that to the AP 14 as part of OFDMA transmission from multiple client stations 25. According to an embodiment, the legacy client station 25-4 includes a PHY processing unit that is generally capable of receiving a data stream that is transmitted by the AP 14 simultaneously with other independent data streams that are intended for other client stations 25. But the legacy client station 25-4 includes a MAC processing unit that is not enabled with MAC layer functions that support receiving the data stream that is transmitted by the AP 14 simultaneously with other independent data streams that are intended for other client stations 25. According to an embodiment, the legacy client station 25-4 includes a PHY processing unit that is generally capable of transmitting a data stream to the AP 14 at the same time that other client stations 25 transmit data to the AP 14. But the legacy client station 25-4 includes a MAC processing unit that is not enabled with MAC layer functions that support transmitting a data stream to the AP 14 at the same time that other client stations 25 transmit data to the AP 14.

In an embodiment, the AP 14 and the client stations 25 contend for communication medium using carrier sense multiple access with collision avoidance (CSMA/CA) protocol or another suitable medium access protocol. Further, in an embodiment, the AP 14 or a client station 25 dynamically selects a bandwidth for a transmission based on channels available for the transmission. In an embodiment, communication between the AP 14 and a legacy client station (e.g., the legacy client station 25-4) occur in a primary channel of the WLAN 10, or in a wider channel that includes the primary channel of the WLAN 10. For example, the legacy communication protocol requires that each transmission includes the primary channel, in an embodiment. On the other hand, communication between the AP 14 and a non-legacy client station 25 (e.g., the client station 25-1) can occur in one or more communication channels that do not include the primary channel, in an embodiment. For example, the non-legacy communication protocol, such as the HEW communication protocol, allows communication between the AP and the client stations to occur in a communication channel that does not include the primary channel, in an embodiment.

In an embodiment, the AP 14 is configured to transmit different OFDM units to different client stations 25 simultaneously by forming an OFDMA data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations. In an embodiment, when the one or more client stations include a legacy client station, the AP assigns a channel that includes a primary channel of the WLAN 10 to the legacy client station, and assigns one or more non-primary communication channels of the WLAN 10 to one or more non-legacy client stations. When the one or more client stations do not include any legacy client stations, the AP assigns the primary and the non-primary communication channels in any suitable manner to the one or more client stations, in various embodiments.

Figure 2:
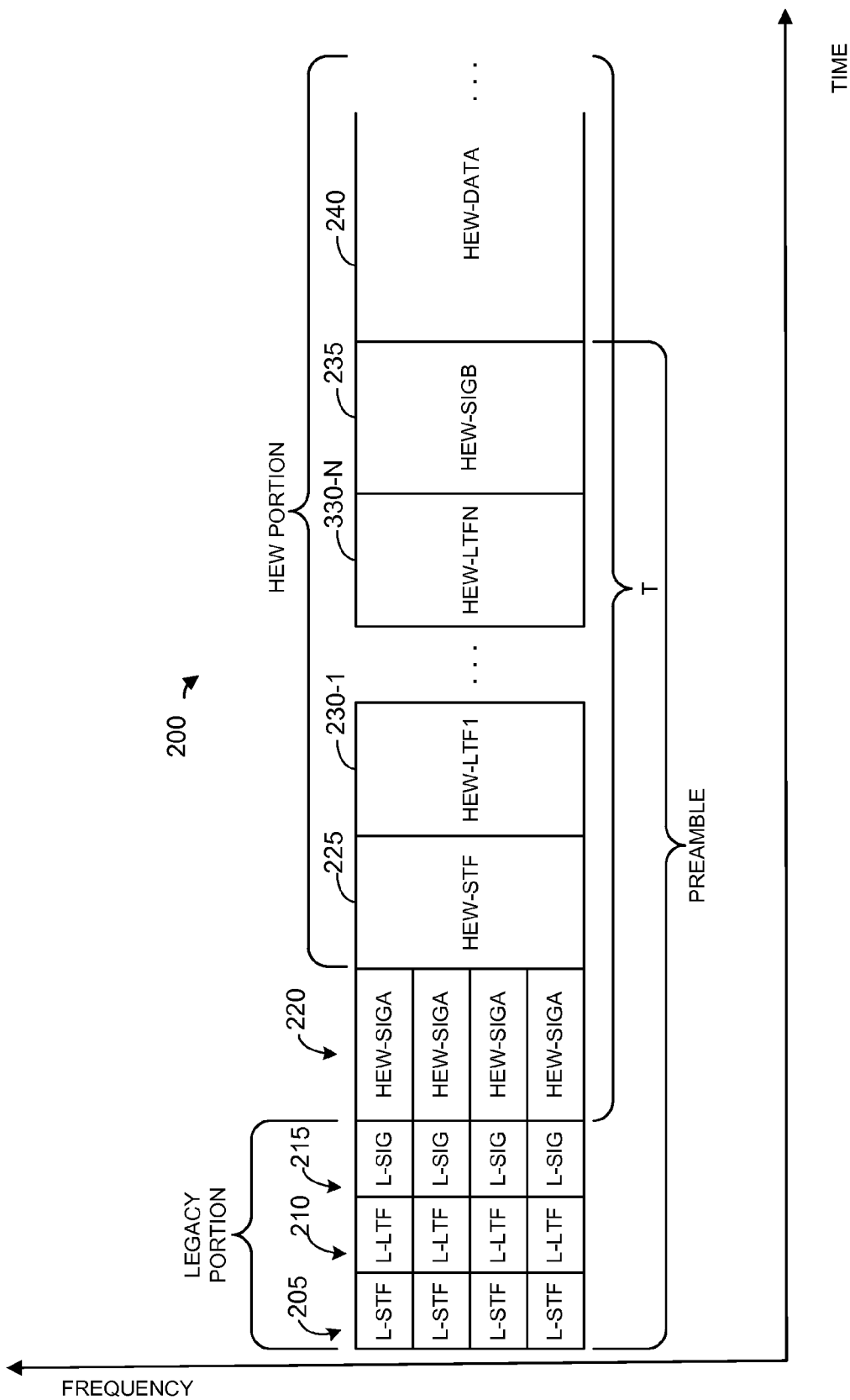
FIG. 2 is a diagram of an example orthogonal frequency division multiplexing (OFDM) data unit, according to an embodiment.

FIG. 2 is a diagram of an OFDM data unit 200, according to an embodiment. In an embodiment, an AP (e.g., the AP 14) is configured to transmit to a client station (e.g., the client station 25-1) using orthogonal frequency division multiplexing (OFDM) modulation, according to an embodiment. In an embodiment, a client station (e.g., the client station 25-1) is configured to transmit the data unit 200 to an AP (e.g., the AP 14). The data unit 200 conforms to the HEW protocol and occupies an 80 MHz band. In other embodiments, data units similar to the data unit 200 occupy different bandwidths such as 20 MHz, 40 MHz, 120 MHz, 160 MHz, or any suitable bandwidth. The data unit 200 is suitable for "mixed mode" situations, such as when the WLAN 10 includes a client station (e.g., the legacy client station 40) that conforms to the legacy protocol, but not the HEW protocol. The data unit 200 can be utilized in other situations as well.

The data unit 200 includes a preamble having four legacy short training fields (L-STFs) 205; four legacy long training fields (L-LTFs) 210; four legacy signal fields (L-SIGs) 215; four first high efficiency WLAN signal fields (HEW-SIGAs) 220; a high efficiency WLAN short training field (HEW-STF) 225; N very high efficiency WLAN long training fields (HHT-LTFs) 230, where N is an integer; and a second high efficiency WLAN signal field (HEW-SIGB) 235. The data unit 200 also includes a high efficiency WLAN data portion (HEW-DATA) 240. The L-STFs 205, the L-LTFs 210, and the L-SIGs 215 form a legacy portion. The HEW-SIGA 220, HEW-STF 225, the HEW-LTFs 230, the HEW-SIGB 235, and the HEW-DATA 240 form a high efficiency WLAN (HEW) portion.

Each of the L-STFs 205, each of the L-LTFs 210, each of the L-SIGs 215, and each of the HEW-SIGAs 220 occupy a 20 MHz band, in one embodiment. The data unit 200 is described as having an 80 MHz contiguous bandwidth for the purposes of illustrating an example frame format, but such frame format is applicable to other suitable bandwidths (including noncontiguous bandwidths). For instance, although the preamble of the data unit 200 includes four of each of the L-STFs 205, the L-LTFs 210, the L-SIGs 215, and the HEW-SIGAs 220, in other embodiments in which an OFDM data unit occupies a cumulative bandwidth other than 80 MHz, such as 20 MHz, 40 MHz, 120 MHz, 160 MHz, etc., a different suitable number of the L-STFs 205, the L-LTFs 210, the L-SIGs 215, and the HEW-SIGAs 220 are utilized accordingly. For example, for an OFDM data unit occupying a 20 MHz cumulative bandwidth, the data unit includes one of each of the L-STFs 205, the L-LTFs 210, the L-SIGs 215, and the HEW-SIGAs 220; a 40 MHz bandwidth OFDM data unit includes two of each of the fields 205, 210, 215, and 220; a 120 MHz bandwidth OFDM data unit includes six of each of the fields 205, 210, 215, and 220; a 160 MHz bandwidth OFDM data unit includes eight of each of the fields 205, 210, 215, and 220, and so on, according to some embodiments.

In the example data unit 200, each of the HEW-STF 225, the HEW-LTFs 230, the HEW-SIGB 235, and the HEW-DATA 240 occupy the entire 80 MHz cumulative bandwidth of the data unit 200. Similarly, in the case of an OFDM data unit conforming to the HEW protocol and occupying a cumulative bandwidth such as 20 MHz, 40 MHz, 120 MHz, or 160 MHz, each of the HEW-STF 225, the HEW-LTFs 230, the HEW-SIGB 235, and the HEW-DATA 240 occupy the corresponding entire cumulative bandwidth of the data unit, in some embodiments.

In some embodiments, the 80 MHz band of the data unit 200 is not contiguous, but includes two or more smaller bands, such as two 40 MHz bands, separated in frequency. Similarly, for other OFDM data units having different cumulative bandwidths, such as a 160 MHz cumulative bandwidth, in some embodiments the band is not contiguous in frequency. Thus, for example, the L-STFs 205, the L-LTFs 210, the L-SIGs 215, and the HEW-SIG2s 220 occupy two or more bands that are separated from each other in frequency, and adjacent bands are separated in frequency by at least one MHz, at least five MHz, at least 10 MHz, at least 20 MHz, for example, in some embodiments.

According to an embodiment, each of the L-STFs 205 and each of the L-LTFs 210 have a format as specified in a legacy protocol such as the IEEE 802.11a Standard, the IEEE 802.11n Standard, and/or the IEEE 802.11ac Standard. In an embodiment, each of the L-SIGs 215 has a format at least substantially as specified in legacy protocol (e.g., the IEEE 802.11a Standard, the IEEE 802.11n Standard, and/or the IEEE 802.11ac Standard). In such embodiments, the length and rate subfields in the L-SIGs 215 is set to indicate the duration T corresponding to the remainder of the data unit 200 after the legacy portion. This permits client stations that are not configured according to the HEW protocol to determine an end of the data unit 200 for carrier sense multiple access/collision avoidance (CSMA/CA) purposes, for example. For example, the legacy client stations determine the duration of the remainder of the data unit 200 and refrain from accessing the medium (or at least transmitting in the medium) for the duration of the remainder of the data unit 200, in an embodiment. In other embodiments, each of the L-SIGs 215 has a format at least substantially as specified in legacy protocol (e.g., the IEEE 802.11a Standard, the IEEE 802.11n Standard, and/or the IEEE 802.11ac Standard) but with length field in the L-SIGs 225 set to indicate a duration of the time remaining in a transmission opportunity during which the data unit 200 is transmitted. In such embodiments, client stations that are not configured according to the HEW protocol determine an end of the TXOP and refrain from accessing the medium (or at least transmitting in the medium) for the duration of the TXOP, in an embodiment.

In the data unit 200, the frequency domain symbols of the legacy portion are repeated over four 20 MHz subbands of the 80 MHz band. Legacy client stations that are configured to operate with 20 MHz bandwidth will recognize a legacy preamble in any of the 20 MHz subbands. In some embodiments, the modulations of the different 20 MHz subband signals are rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment.

In some embodiments, the modulations of the HEW-SIGAs 220 in the different 20 MHz subbands is rotated by different angles. In one example, a first subband is rotated 0 degrees, a second subband is rotated 90 degrees, a third subband is rotated 180 degrees, and a fourth subband is rotated 270 degrees, in an embodiment. In other examples, different suitable rotations are utilized. As just one example, a first subband is rotated 45 degrees, a second subband is rotated 90 degrees, a third subband is rotated −45 degrees, and a fourth subband is rotated −90 degrees, in an embodiment. In an embodiment, the same rotations utilized in the legacy portion are utilized for the HEW-SIGAs 220. In at least some examples, the HEW-SIGAs 220 are collectively referred to as a single high efficiency WLAN signal field (HEW-SIGA) 220.

In an embodiment, the AP 14 transmits respective OFDM data units, such as the OFDM data unit 200, simultaneously to multiple client stations 25 simultaneously as parts of a downlink OFDMA transmission from the AP 14 to the multiple client stations 25. In an embodiment, the AP 14 transmits the respective OFDM data units in respective sub-channels allocated to the client stations. Similarly, in an embodiment, multiple client stations 25 transmit respective OFDM data units, such as the OFDM data unit 200, simultaneously to the AP 14 as parts of an uplink OFDMA transmission from the multiple client stations 25 to the AP 14. In an embodiment, the client stations 25 transmit the respective OFDM data units in respective sub-channels allocated to the client stations 25. In an embodiment, a sub-channel allocated to a particular client station corresponds to a single sub-channel block of adjacent sub-carriers of the communication channel. In an embodiment, a sub-channel block allocated to a particular client station includes several sib-channel blocks of adjacent sub-carriers, each sub-channel block having a subset of sub-carriers allocated to the particular client station. In an embodiment, the several sub-channel blocks corresponding to a particular client station are uniformly distributed over the communication channel. In another embodiment, the several sub-channel blocks are not necessarily uniformly distributed over the communication channel. For example, the several sub-channel blocks are randomly distributed over the communication channel, or are distributed according to another suitable distribution scheme over the communication channel, in some embodiments.

FIGS. 3A-3C are diagrams of example channel allocation schemes in an 80 MHz communication channel, according to various embodiments. In each of FIGS. 3A-3C, respective 20 MHz sub-channels are allocated to each of four client stations 25 (STA1, STA2, STA3 and STA4). In FIG. 3A, each of the sub-channels, allocated to a particular one of STA1, STA2, STA3 and STA4, consists of a single sub-channel block of adjacent sub-carriers allocated to the particular station. In FIG. 3B, each of the sub-channels, allocated to a particular one of STA1, STA2, STA3 and STA4, consists of four respective sub-channel blocks uniformly spaced over the entire 80 MHz channel. In FIG. 3C, each of the sub-channels consists of four respective non-uniformly (e.g., randomly) spaced over the entire 80 MHz channel. In each of FIGS. 3B and 3C, each of the sub-channel blocks allocated to a particular client station includes a block of adjacent sub-carriers, wherein the block of adjacent sub-carriers includes a subset of sub-carriers, of the 80 MHz channel, allocated to the particular client station, according to an embodiment.

In some embodiments, a sub-channel having a suitable bandwidth less than the smallest bandwidth of the WLAN can be allocated to a client station. For example, in some embodiments in which the smallest bandwidth of the WLAN 10 is 20 MHz, sub-channel having bandwidth less than 20 MHz, such as sub-channels having bandwidths of 10 MHz and/or 5 MHz can be allocated to client stations, in at least some scenarios.

Figure 4C:
Figure 4D:
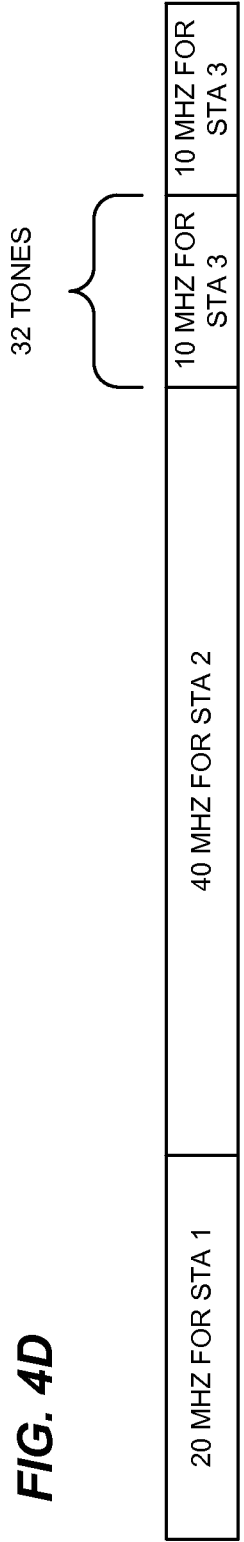

FIGS. 4A, 4B, 4C and 4D are diagrams illustrating example OFDM sub-channels of an 80 MHz communication channel, according to various embodiments. In FIG. 4A, the communication channel is partitioned into four contiguous sub-channels, each having a bandwidth of 20 MHz. The OFDM sub-channels include independent data streams for four client stations. In FIG. 4B, the communication channel is partitioned into two contiguous sub-channel channels, each having a bandwidth of 40 MHz. The OFDM sub-channels include independent data streams for two client stations. In FIG. 4C, the communication channel is partitioned into three contiguous OFDM sub-channels. Two OFDM sub-channels each have a bandwidth of 20 MHz. The remaining OFDM sub-channel has a bandwidth of 40 MHz. The OFDM sub-channels include independent data streams for three client stations. In FIG. 4D, the communication channel is partitioned into four contiguous OFDM sub-channels. Two OFDM sub-channels each have a bandwidth of 10 MHz, one OFDM sub-channel has a bandwidth of 20 MHz, and one OFDM sub-channel has a bandwidth of 40 MHz. The OFDM sub-channels include independent data streams for three client stations.

Although in FIGS. 4A, 4B, 4C, and 4D the OFDM sub-channels are contiguous across the communication channel, in other embodiments the OFDM sub-channels are not contiguous across the communication channel (i.e., there are one or more gaps between the OFDM sub-channels). In an embodiment, each gap is at least as wide as one of the OFDM sub-channel blocks. In another embodiment, at least one gap is less than the bandwidth of an OFDM sub-channel block. In another embodiment, at least one gap is at least as wide as 1 MHz. In an embodiment, different OFDM sub-channel blocks are transmitted in different channels defined by the IEEE 802.11a, 802.11n and/or 802.11ac Standards. In one embodiment, the AP includes a plurality of radios and different OFDM sub-channel blocks are transmitted using different radios.

In FIGS. 4A, 4B, 4C and 4D, each sub-channel corresponds to a single sub-channel block of adjacent sub-carriers allocated to a particular client station. In other embodiments, each of at least some sub-channels of an 80 MHz channel corresponds to several sub-channel blocks, each having adjacent sub-carriers, where the several sub-channel blocks collectively comprise the sub-carriers allocated to a particular client station. The several sub-channel blocks corresponding to a particular client station are uniformly or non-uniformly distributed over the 80 MHz channel, for example as described above with respect to FIGS. 3B and 3C, in some embodiments. In such embodiments, an independent data stream for the particular client station is accordingly distributed over the 80 MHz channel.

Figure 5:
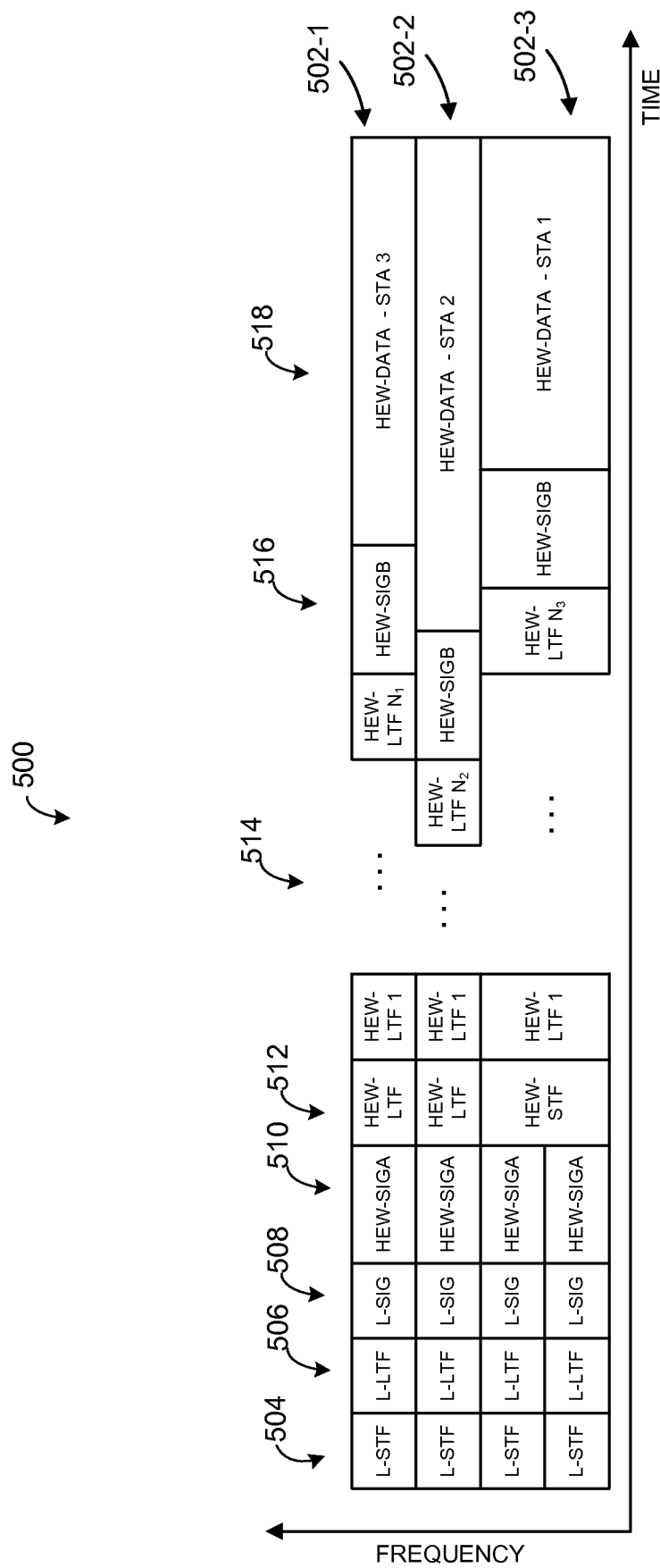
FIG. 5 is a diagram of an example orthogonal frequency division multiple access (OFDMA) data unit, according to an embodiment.

FIG. 5 is a diagram of an example OFDMA data unit 500, according to an embodiment. The OFDMA data unit 500 includes a plurality of OFDM data unit 502-1, 502-2 and 502-3 having independent data streams corresponding to three client stations 25. In an embodiment, each OFDM data unit 502 is the same as or similar to the OFDM data unit 200 of FIG. 2. In an embodiment, the AP 14 transmits the OFDM data units 502-1, 502-2, 502-3 to different client stations 25 via respective OFDM sub-channels within the OFDMA data unit 500. In another embodiment, different client stations 25 transmit respective OFDM data units 502-1, 502-2, 502-3 to the AP 14 in respective OFDM sub-channels within the OFDMA data unit 500. In this embodiment, the AP 14 receives the OFDM data units 502-1, 502-2, 502-3 from the client stations 25 via respective OFDM sub-channels of within the OFDMA data unit 500, in this embodiment.

Each of the OFDM data units 502-1, 502-2, 502-3 conforms to a communication protocol that defines OFDMA communication, such as the HEW communication protocol, in an embodiment. In an embodiment in which the OFDMA data unit 500 corresponds to a downlink OFDMA data unit, the OFDMA data unit 500 is generated by the AP 14 such that each OFDM data unit 502 is transmitted to a respective client station 25 via a respective sub-channel of the WLAN 10 allocated for downlink transmission of the OFDMA data unit 500 to the client station. Similarly, an embodiment in which the OFDMA data unit 500 corresponds to an uplink OFDMA data unit, the AP 14 receives the OFDM data units 502 via respective sub-channels of the WLAN 10 allocated for uplink transmission of the OFDM data units 502 from the client stations, in an embodiment. For example, the OFDM data unit 502-1 is transmitted via a first 20 MHZ sub-channel of the WLAN 10, the OFDM data unit 502-2 is transmitted via a second 20 MHz sub-channel of the WLAN 10, and the OFDM data unit 502-3 is transmitted via a 40 MHz sub-channel of the WLAN 10, in the illustrated embodiment.

Each of the OFDM data units 502 is the same as or similar to the OFDM data unit 200 of FIG. 2. In an embodiment, each of the OFDM data units 502 includes a preamble including one or more legacy short training fields (L-STF) 504, one or more legacy long training fields (L-LTF) 506, one or more legacy signal fields (L-SIG) 508, one or more first high efficiency WLAN signal field (HEW-SIG-A) 510, N HEW long training fields (HEW-LTF) and a second HEW signal field (HEW-SIGB) 514. Additionally, each OFDM data unit 502 includes a high efficiency WLAN data portion (HEW-DATA) 518. In an embodiment, each L-LSF field 506, each L-LTF field 508, each L-SIG field 510 and each HEW-SIGA field 512 occupies a smallest bandwidth supported by the WLAN 10 (e.g., 20 MHz). In an embodiment, if an OFDM data unit 502 occupies a bandwidth that is greater than the smallest bandwidth of the WLAN 10, then each L-LSF field 506, each L-LTF field 508, each L-SIG field 510 and each HEW-SIGA field 512 is duplicated in each smallest bandwidth portion of the OFDM data unit 502 (e.g., in each 20 MHz portion of the data unit 502). On the other hand, each HEW-STF field 512, each HEW-LTF field 514, each HEW-SIGB field 516 and each HEW data portion 518 occupies an entire bandwidth of the corresponding OFDM data unit 502, in an embodiment. For example, the OFDM data unit 502-3 occupies 40 MHz, wherein L-LSF field 506, the L-LTF field 508, L-SIG field 510 and HEW-SIGA fields 512 is duplicated in the upper and the lower 20 MHz bands of the OFDM data unit 502-3, while each of the HEW-STF field 512, each of the HEW-LTF fields 514, each of the HEW-SIGB field 516 and each of the HEW data portion 518 occupies the entire 40 MHz bandwidth of the data unit 502, in the illustrated embodiment.

In an embodiment, padding is used in one or more of the OFDM data units 502 to equalize lengths of the OFDM data units 502. Accordingly, the length of each of the OFDM data units 502 correspond to the length of the OFDMA data unit 502, in this embodiment. Ensuring that the OFDM data units 502 are of equal lengths synchronizes transmission of acknowledgment frames by client stations 25 that receive the data units 502, in an embodiment. In an embodiment, each of one or more of the OFDM data units 502 is an aggregate MAC service data units (A-MPDU) (e.g., a very high throughput (VHT) A-MPDU that includes multiple aggregated VHT MAC service data units (MPDUs), an HEW A-MPDU that includes multiple aggregated HEW MAC service data units (MPDUs), or another suitable aggregated data unit that includes multiple aggregated MAC service data units (MP-DUs)), which is in turn included in a PHY protocol data unit (PPDU). In another embodiment, each of one or more of the OFDM data units 502 is a single MPDU (e.g., a single VHT MPDU, a single HEW MPDU, or another suitable non-aggregated data unit) which is in turn included in a PPDU. In an embodiment, padding (e.g., zero-padding) within one or more of the A-MPDUs 502 or single MPDUs 502 is used to equalize the lengths of the data units 502, and to synchronize transmission of acknowledgement frames corresponding to the OFDMA data unit 500.

Figure 6A:
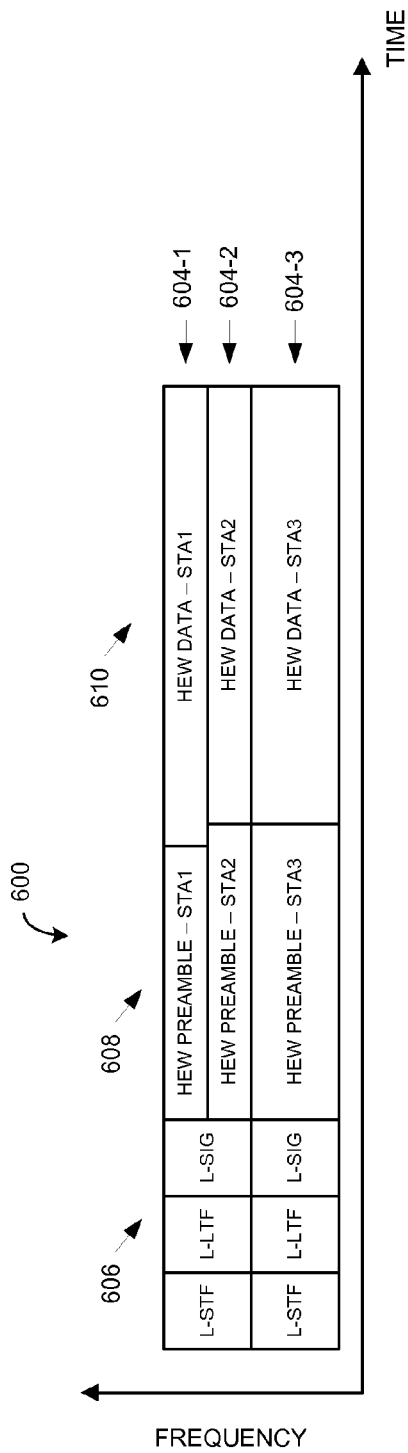
FIG. 6A is a diagram of an example OFDMA data unit, according to another embodiment.

FIG. 6A is a diagram of an example OFDMA data unit 600, according to an embodiment. The OFDMA data unit 600 includes a plurality of OFDM data unit 604-1, 604-2 and 604-3 having independent data streams corresponding to three client stations 25. In an embodiment, the AP 14 transmits the OFDM data units 604-1, 604-2, 604-3 to different client stations 25 via respective OFDM sub-channels within the OFDMA data unit 600. In another embodiment, different client stations 25 transmit respective OFDM data units 604-1, 604-2 and 604-3 to the AP 14 in respective OFDM sub-channels within the OFDMA data unit 600. In this embodiment, the AP 14 receives the OFDM data units 602-1, 602-2, 602-3 from the client stations 25 via respective OFDM sub-channels of within the OFDMA data unit 600.

Each of the OFDM data units 604-1, 604-2 occupies a respective sub-channel having a bandwidth that is less than a smallest channel of the WLAN 10. For example, the smallest channel of the WLAN 10 is 20 MHz, and each of OFDM data units 604-1, 604-2 occupies a respective sub-channel having a bandwidth of 10 MHz, in an embodiment. The OFDM data units 604-1 and 604-2 collectively span the smallest bandwidth channel of the WLAN 10, in an embodiment. The OFDM data unit 604-3 occupies a smallest bandwidth of the WLAN 10, in an embodiment. For example, the OFDM data unit 604-3 occupies 20 MHz, in an embodiment.

In an embodiment, the OFDM data units 604-1 and 604-2 share a legacy preamble 606 that occupies the smallest bandwidth of the WLAN 10 10 (e.g., 20 MHz) collectively spun by the OFDM data units 604-1 and 604-2. The OFDM data unit 604-3 includes a legacy preamble 606 that spans the bandwidth of the OFDM data unit 604-3. In an embodiment, the legacy preamble 606 corresponding to the OFDM data units 604-1 and 604-2 and the legacy preamble 606 corresponding to the OFDM data unit 604-3 are identical. In an embodiment, each legacy preamble 606 is the same as the legacy preamble 202 of the data unit 200 of FIG. 2. For example, each legacy preamble 606 includes an L-STF, and L-LTF and an L-SIG that generally conforms to the legacy communication protocol, in an embodiment.

In an embodiment, each of the OFDM data units 604-1 and 604-2 includes a respective HEW preamble 608 and a respective data portion 610 that each spans the corresponding bandwidth smaller than the smallest channel of the WLAN 10 (e.g., 10 MHz). The OFDM data unit 604-3 includes a HEW preamble 608 and a data portion 610 that each spans the bandwidth of the sub-channel block 604-3, in an embodiment. In an embodiment, each HEW preamble 608 is the same as the HEW preamble 210 of the data unit 200 of FIG. 2. For example, although not shown in FIG. 6, each HEW preamble 608 includes a HEW-SIGA, a HEW-STF, one or more HEW-LTFs and a HEW-SIGB, in an embodiment. In an embodiment, the content of each of the HEW preambles 608 can be variant for different client stations depending on factors such as rate, data quantity, configuration (e.g., number of antennas, number of supported multiple input, multiple output (MIMO) data streams, etc.) of the different client stations.

In some embodiments, one or more of the data portions 610 are omitted from the corresponding one or more OFDM data units 604.

Figure 6B:
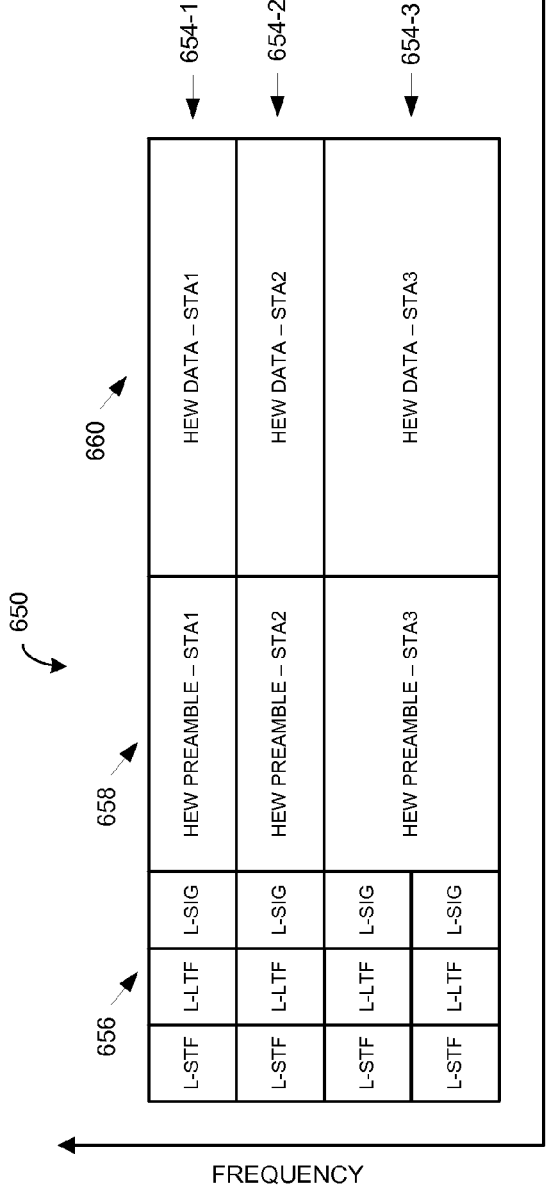
FIG. 6B is a diagram of an example OFDMA data unit, according to another embodiment.

FIG. 6B is a diagram of an example OFDMA data unit 650, according to an embodiment. The OFDMA data unit 650 includes a plurality of OFDM data unit 654-1, 654-2 and 654-3 having independent data streams corresponding to three client stations 25. In an embodiment, the AP 14 transmits the OFDM data units 654-1, 654-2, 654-3 to different client stations 25 via respective OFDM sub-channels within the OFDMA data unit 650. In another embodiment, different client stations 25 transmit respective OFDM data units 654-1, 654-2 and 654-3 to the AP 14 in respective OFDM sub-channels within the OFDMA data unit 650. In this embodiment, the AP 14 receives the OFDM data units 654-1, 654-2, 654-3 from the client stations 25 via respective OFDM sub-channels of within the OFDMA data unit 650.

In an embodiment, the OFDMA data unit 650 occupies an 80 MHz bandwidth, in an embodiment. Each of the OFDM data units 654-1 and 654-2 occupies a respective 20 MHz sub-channel of the OFDMA data unit 650, while the OFDM data unit 654-3 occupies a 40 MHz sub-channel of the OFDMA data unit 650, in an embodiment. In an embodiment, the OFDMA data unit 650 includes several legacy preambles 656. In particular, each of the OFDM data units 654-1 and 654-2 includes a legacy preamble 656 that spans the 20 MHz sub-channel occupied by the corresponding OFDM data unit, and the data unit 654-3 includes a legacy preamble 656 replicated in each 20 MHz band of the 40 MHz band occupied by the data unit 654, in an embodiment. In an embodiment, each of the legacy preambles 656 is the same as the legacy preamble 202 of the data unit 200 of FIG. 1. Each of the legacy preambles 656 includes one or more L-STFs, one or more L-LTFs and one or more L-SIGs, in an embodiment.

In an embodiment, each of the OFDM data units 654 is directed to a particular client station and includes a HEW preamble 656 for the particular client station. In an embodiment, each of the OFDM data units 654 also includes a data portion 660. In another embodiment, each of one or more of the OFDM data units 654 omits the data portion 660. In an embodiment, one or more of the OFDM data units 654 is not directed to a particular client station. For example, each of one or more of the OFDM data units 654 is directed to multiple client stations, such as a multi-user a multi-user group of client stations, a multi-cast group of client stations, for example.

In an embodiment, each HEW preamble 658 is the same as the HEW preamble 210 of the data unit 200 of FIG. 2. For example, although not show in FIG. 6B, each includes a HEW-SIGA (or two HEW-SIGAs each spanning a smallest bandwidth of the legacy protocol, as would be in the case of the sub-channel block 654-3), a HEW-STF, one or more HEW-LTFs and a HEW-SIGB, in an embodiment. In an embodiment, the content of each of the HEW preambles 658 can be variant for different client stations depending on factors such as rate, data quantity, configuration (e.g., number of antennas, number of supported multiple input, multiple output (MIMO) data streams, etc.) of the different client stations. In an embodiment, the HEW preamble 658 and, if present, the corresponding HEW data portion 660 comprise an OFDM data unit directed to a particular client station, or, alternatively, an OFDM data unit or frame directed to multiple client stations.

In various embodiments described below, frame exchanges include transmission of OFDMA data units, such as the OFDMA data unit 500 of FIG. 5, the OFDMA data unit 600 of FIG. 6A or the OFDMA data unit 650 of FIG. 6B, or other suitable OFDM data units, such as OFDM data units having other suitable bandwidths and/or other suitable sub-channel allocations, for example. Such OFDMA data units are downlink OFDMA data units that include respective OFDM data units simultaneously transmitted by an AP to a plurality of client stations in some cases, and are uplink OFDMA data units that include respective OFDM data units simultaneously transmitted form a plurality of client stations to an AP, in other cases.

Figure 7:
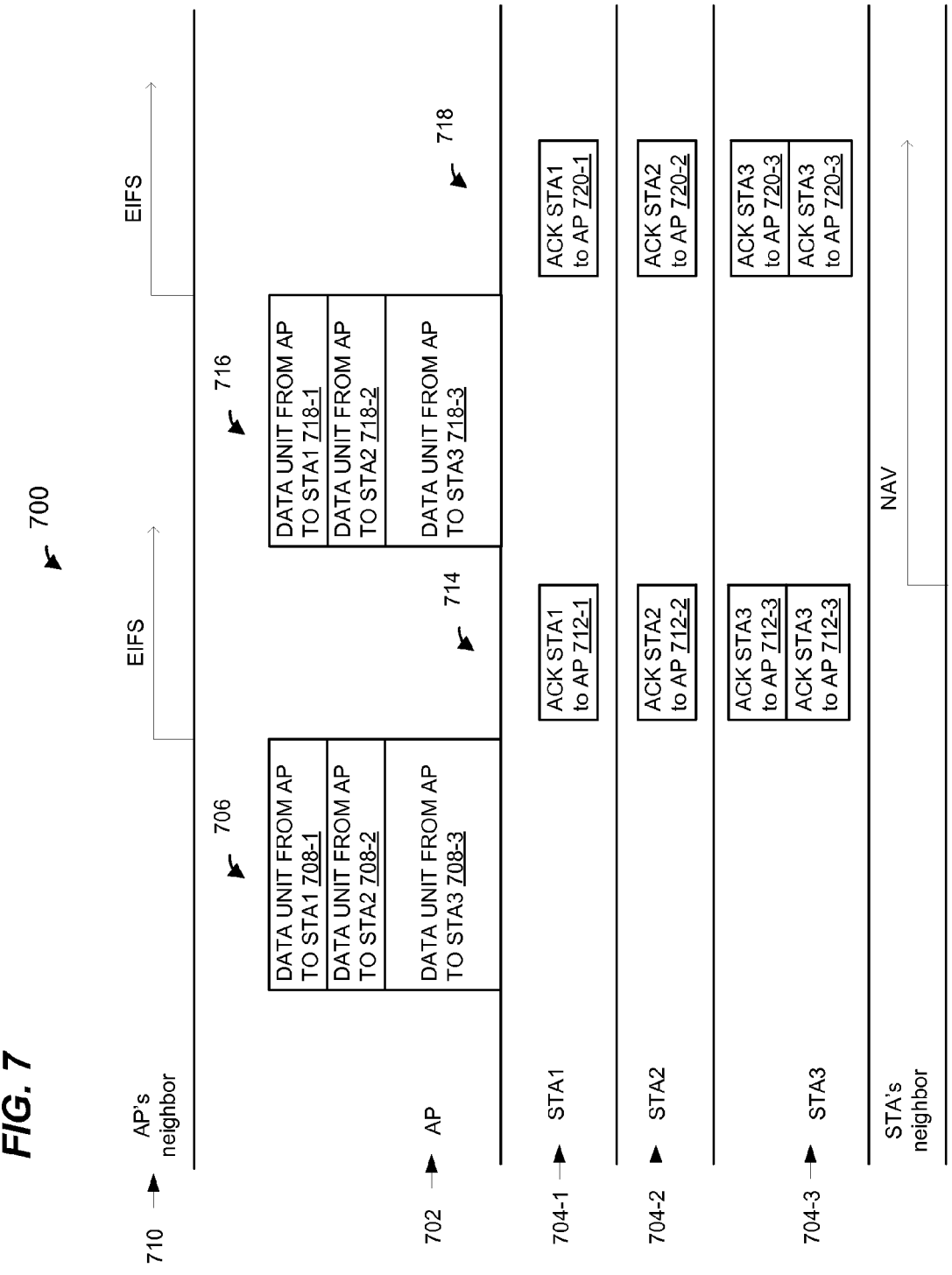
FIG. 7 is a diagram illustrating a frame exchange between an AP and a plurality of client stations, according to an embodiment.

FIG. 7 is diagram illustrating a frame exchange 700 between an AP and a plurality of client stations, according to an embodiment. In particular, an AP 702 utilizes OFDMA communication to communicate with a plurality of client stations 704, including a first client station STA1 704-1, a second client station STA2 704-2, and a third client station STA3 704-3, in the illustrated embodiment. With reference to FIG. 1, in an embodiment, the AP 702 corresponds to the AP 14 and the client stations 704 correspond to different ones of the client stations 25.

The AP 702 transmits an OFDMA data unit 706 directed to the plurality of client stations 704. In an embodiment, the OFDMA data unit 706 includes respective OFDM data units 708 directed to each of the client stations 704 and are transmitted in respective sub-channels allocated to the client stations 704. For example, in the illustrated embodiment, a first OFDM data unit 708-1 is transmitted in a first 20 MHz sub-channel allocated to the client station STA1 704-1, a second OFDM data unit 708-2 is transmitted in a second 20 MHz sub-channel allocated to the client station STA2 704-2, and a third OFDM data unit 708-3 is transmitted in a 40 MHz sub-channel allocated to the client station STA3 704-3, in the illustrated embodiment. In an embodiment the OFDMA data unit 706 includes, in a preamble (e.g., in a signal field of a HEW preamble, such as in the HEW-SIGA field of the HEW preamble) of the data unit 706, indications of the respective sub-channels allocated to the client stations 704. Each client station 704 receives the preamble of the OFDMA data unit 706 in a primary channel of the WLAN, determines the particular sub-channel allocated to the client station 704 based on an indication included in the preamble of the data unit 706, tunes to the sub-channel allocated to the client station 704, and receives its portion of the data unit 706 (i.e., the OFDM data unit 708 that includes data for the client station 704) in the sub-channel allocated to the client station 704, in an embodiment.

In an embodiment, the OFDMA data unit 706 includes a legacy signal field that indicates, to legacy and/or non-OFDMA devices, a duration of the data unit 706. Legacy and/or non-OFDMA devices that receive the legacy signal field of the data unit 706 are able to determine the length of the data unit 706 and to deter transmission for the duration corresponding to the length of the data unit 706, in an embodiment. Further, because a legacy and/or non-OFDMA device detects an error when trying to decode any non-legacy portion of the data unit 706, the legacy and/or non-OFDMA device sets an extended interframe space (EIFS) timer to count down for EIFS duration after the end of the data unit 706. Thus, the legacy and/or non-OFDMA device further defers transmission for the duration corresponding to duration of EIFS after the end for the data unit 706.

For example, a communication device 710, located within the communication range of the AP 702, is not configured to operate according to the HEW communication protocol and/or does not support OFDMA communication. In an embodiment, the communication device 710 determines the length of the of the data unit 706 based on the duration indicated in the legacy signal field of the data unit 706. The communication device 710, however, detects an error in the data unit 706, and accordingly sets an EIFS timer to EIFS duration after the end of the data unit 706. Accordingly, the communication device 710 refrains from transmitting in the medium after the end of the data unit 706 for the duration of EIFS after the end of the data unit 702.

In an embodiment, client stations STA1 704-1, STA2 704-2, and STA3 704-3 receive their respective portions (respective OFDM data units 708) transmitted in the OFDMA data unit 706, and transmit respective acknowledgement (ACK or BlkAck) frames 712 to the AP 14. In an embodiment, the client stations 704 transmit the respective acknowledgement frames 712 simultaneously, in respective sub-channels, as parts of an OFDMA transmission 714 to the AP 14. The AP 702 synchronizes transmission of the ACK frames 712 from the client stations 704 by ensuring that the OFDM data units 708-1, 708-2, 708-3 are of equal length, in an embodiment. For example, the AP 702 adds padding bits (e.g., bits having predetermined values such as zero bits or one bits) to data bits in one or more of the data units 708 to equalize lengths of the data units 708, in an embodiment. For example, in an embodiment in which the OFDM data units 708-1, 708-2, 708-3 are A-MPDUs, the AP 14 utilizes A-MPDU padding in one or more of the data units 708-1, 708-2, 708-3 to ensure that the data units 708-1, 708-2, 708-3 are of the same length. As another example, in an embodiment in which the OFDM data units 708-1, 708-2, 708-3 are MPDUs, and the AP 702 utilizes MPDU padding in one or more of the data units 708-1, 708-2, 708-3 to ensure that the data units 708-1, 708-2, 708-3 are of the same length.

Each ACK frame 712 conforms to a legacy control frame format, in an embodiment. For example, each ACK frame 712 conforms to a control frame format defined by the IEEE 802.11a, 802.11n and/or 802.11ac Standards. In an embodiment, each client station 704 transmits its ACK frame 712 using the channel allocated to the client station 704 for receiving the OFDM data unit 708 directed to the client station 704. Thus, for example, STA1 704-1 transmits the ACK frame 712-1 in the first 20 MHz channel allocated to the STA1 704-1 for receiving the OFDM data unit 708-1, STA1 704-1 transmits the ACK frame 712-1 in the second 20 MHz channel allocated to the STA2 704-2 for receiving the OFDM data unit 708-2, and STA3 704-3 transmits the ACK frame 712-3 in the 40 MHz channel allocated to the STA1 704-3 for receiving the OFDM data unit 708-3. In an embodiment, each of the ACK frames 712 occupies the smallest bandwidth channel defined in the network. For example, each ACK frame 712 occupies a 20 MHz bandwidth, in the illustrated embodiment. The ACK frame 712, transmitted in a 40 MHz channel, is duplicated in the lower 20 MHz and the upper 20 MHz portions of the 40 MHz channel, in the illustrated embodiment. In another embodiment, each ACK frame 712 occupies the bandwidth of the entire channel in which the ACK frame is transmitted. For example, the ACK frame 712-3 occupies the entire 40 MHz channel allocated to STA3 704-3, in another embodiment.

In an embodiment, each ACK frame 712 includes a duration field set to indicate a time corresponding to transition of a second OFDMA data unit 716 to the client stations 704, having respective OFDM data units 718 directed to respective client stations 704, and transmission of respective to acknowledgement frames 720 by the client stations 704 in response to receiving their respective OFDM data units 718. In an embodiment, the acknowledgement frames 718 are transmitted by the client statins 704 simultaneously, in respective sub-channels allocated to the client stations 704, as parts of an OFDMA transmission to the AP 702. Communication devices within the communication range of each of the client stations 704 determine, based on the duration indicated by the ACK frames 712, the duration corresponding to transition of the OFDMA data unit 716 and transmission of the acknowledgement frames 720, and set their network allocation vector (NAV) accordingly to refrain from transmission in the medium for the determined duration after the end of the ACK frames 712. For example, a communication device 730 within the communication range of a client station 704 (e.g., STA3 704-3) sets its NAV according to the duration indicated by the legacy signal field of the ACK frame 712 to refrain from transmission in the medium for the duration corresponding to transition of the OFDMA data unit 716 and transmission of the acknowledgement frames 720 after the end of the ACK frame 712, in the illustrated embodiment.

After the AP 704 receives the OFDMA transmission 714, the AP 704 transmits the second OFDMA data unit 716 to the client stations 704. In an embodiment, the AP 704 transmits the OFDMA data unit 716 upon expiration of a predetermined time period, such as a short interframe space (SIFS) after reception of the ACK frames 712. In an embodiment, a combined duration of transmission of the ACK frames 712 and SIFS after reception of the ACK frames 712 is less than the duration of EIFS. Thus, the AP 704 transmits the OFDMA data unit 716 before expiration of the EIFS timer at the communication device 710. Accordingly, transmission of the OFDMA data unit 716 is protected from transmissions by the communication device 710. After receiving the respective OFDM data units 718, client stations 704 transmit the respective ACK frames 720 to the AP 702. Transmission of the ACK frames 720 are protected from transmission by the communication device 730 and/or other communication device within the communication range of the client stations 704 because of the NAV the communication device 730 and/or other communication device within the communication range of the client stations 704 based on the ACK frames 712, in an embodiment.

Figure 8A:
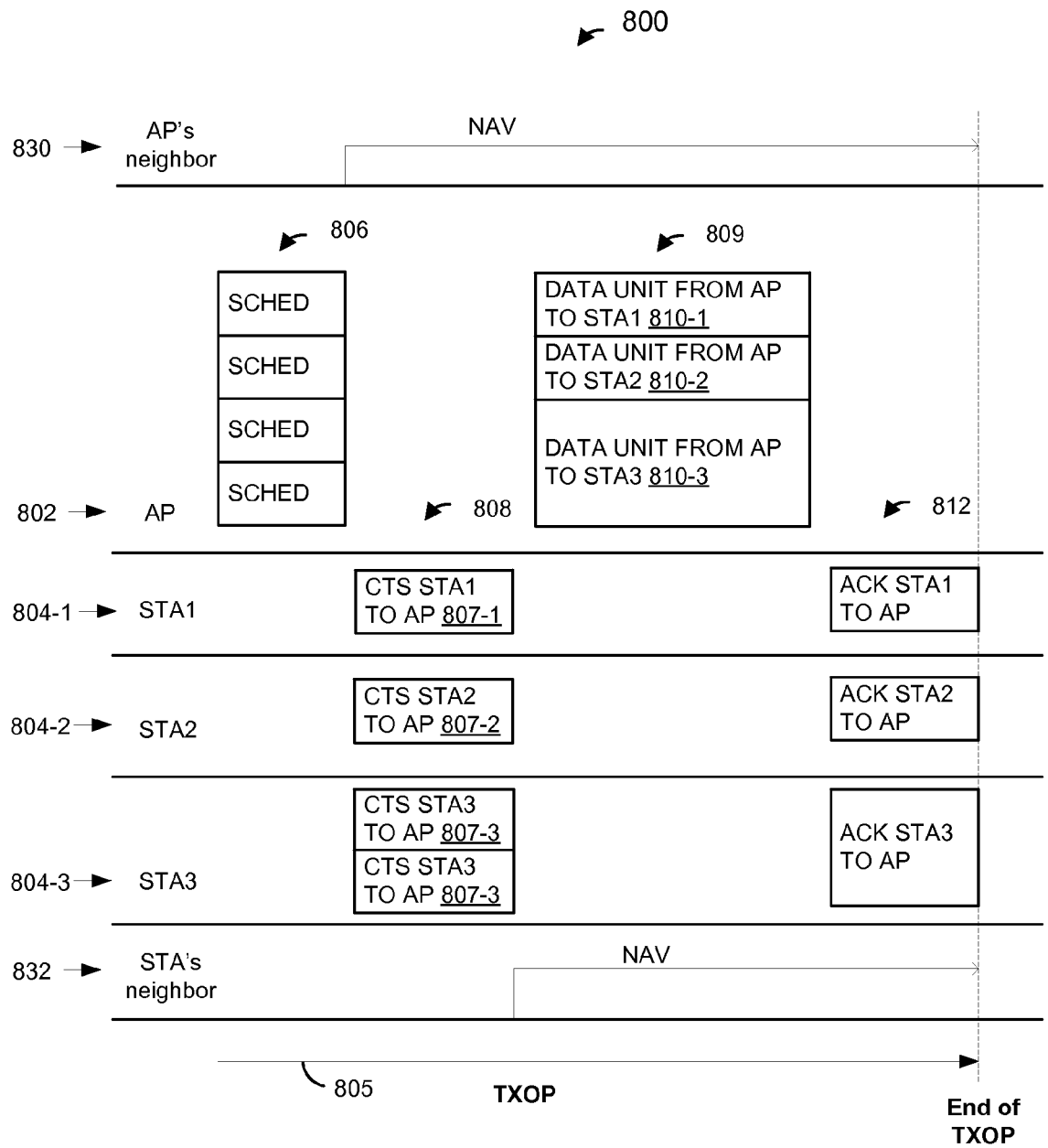
FIG. 8A is a diagram illustrating a frame exchange between an AP and a plurality of client stations, according to another embodiment.

FIG. 8A is diagram illustrating a frame exchange 800 between an AP and a plurality of client stations, according to an embodiment. In particular, an AP 802 utilizes OFDMA communication to communicate with a plurality of client stations 804, including a first client station STA1 804-1, a second client station STA2 804-2, and a third client station STA3 804-3, in the illustrated embodiment. With reference to FIG. 1, in an embodiment, the AP 802 corresponds to the AP 14 and the client stations 804 correspond to different ones of the client stations 25. In an embodiment, respective sub-channels are statically allocated to the plurality of client stations 804 for OFDMA communication with the plurality of the client stations 804. For example, respective 20 MHz sub-channels are allocated to each of the client stations 804-1 and 804-2, and a 40 MHz sub-channel is allocated to the client station 804-3, in the illustrated embodiment. The frame exchange 800 occurs during a transmit opportunity 805 obtained by the AP 802 for OFDMA communication with the client stations 804 or scheduled for OFDMA communication with the client stations 804, in various embodiments.

The AP 802 transmits a control frame, such as a scheduling frame, 806 to the plurality of client stations 804, in an embodiment. In an embodiment, the control frame 806 is a legacy control frame that at least substantially conforms to a legacy communication protocol (e.g., the IEEE 802.11a Standard, the IEEE 802.11n Standard, and/or the IEEE 802.11ac Standard). In an embodiment, the AP 802 transmits the control frame 806 at the beginning of the TXOP 805 obtained or scheduled for OFDMA communication between the AP 802 and client stations 804. In an embodiment, the control frame 806 is duplicated in each 20 MHz sub-channel of an OFDM channel obtained or scheduled for OFDMA communication between the AP 802 and the client stations 804 during the TXOP 805. In an embodiment, the control frame 806 includes an indication of a remaining duration of the TXOP 805 after transmission of the control frame 806. For example, in an embodiment, the control frame 806 indicates a length or duration corresponding to transmission of control frames 807 (e.g., clear to send (CTS) frames) by the client stations 804 to the AP 802 in response to receiving the scheduling frame 806, transmission of an OFDMA data unit 809 from the AP 802 to the client stations 804, and transmission of acknowledgement frames (e.g., ACK frames of BlkAck frames) 812 by the client stations 804 to acknowledge receipt of respective OFDM data units 810 transmitted to the client stations 804 as parts of the data unit 809, in an embodiment.

As used herein, "a length or duration corresponding to transmission of a frame" or "a length or duration corresponding to transmission of a frame" is intended to include duration of transmission of the frame (or data unit) itself as well as duration of an interframe space between transmission of a previous frame (or data unit) and transmission of the frame (or data unit) itself, in at least some situations. For example, as used herein, a duration corresponding to transmission of acknowledgement frames 812 includes duration of transmission of the acknowledgement frames 812 as well as an interframe space (e.g., SIFS) between transmutation of the OFDMA data unit 809 and the acknowledgement frames 812, in at least some situations.

In an embodiment in which the control frame 806 is a scheduling frame, the control frame 806 identifies the client stations 804 that are intended participants in the TXOP 805, for example by including at least a partial association identifier (AID) corresponding to each of the client stations 804 that are intended participants in the TXOP 805, and includes channel allocation information for downlink OFDMA transmission to the identified client stations 804. For example, the control frame 806 indicates, for each identified client station 804, one or more 20 MHz sub-channels allocated for OFDMA downlink transmission to the client station 804 during the TXOP 805, in an embodiment. In another embodiment, client stations 804 are identified as intended participants in the TXOP 805 prior to the beginning of the TXOP 805 and/or channel allocation information is provided to the participants in the TXOP 805 prior to the beginning of the TXOP 805. For example, in a sub-channel selective transmission technique, the AP 802 signals sub-channel allocation information to the client station 804 for use during scheduled period corresponding to the TXOP 805 prior to the beginning of TXOP, in an embodiment. In such embodiments, the control frame 806 need not include channel allocation information. In some such embodiments, the control frame 806 is a control frame other than a scheduling frame. For example, the control frame 806 is a request to send (RTS) frame, in one such embodiment.

In an embodiment, communication devices in the communication range of the AP 802 determine the duration indicated by the control frame 806, and set their NAVs accordingly to refrain from transmission in the medium for the determined duration indicated by the control frame 806. Accordingly, the communication devices refrain from transmission in the medium for the reaming duration of the TXOP after the control frame 806, in an embodiment. For example, a communication device 830 in the communication range of the AP 802 sets its NAV according to the duration indicated by control frame 806 to refrain from transmission in the medium for the remaining duration of the TXOP after the control frame 806, in the illustrated embodiment. Thus, transmission of the control frames 807 from the client stations 804 to the AP 802, transmission of the OFDMA data unit 809 from the AP 802 to the client stations 804, and transmission of the acknowledgement frames 812 from the client stations 804 to the AP 802 are protected from transmissions by the communication device 830, in an embodiment.

In an embodiment, the control frame 806 includes a request for transmission of control frames 807 by the client stations 804 in response to receiving the control frame 806. In an embodiment, the control frames 807 requested by the control frame 806 to be transmitted in response to receiving the control frame 807 are clear to send (CTS) frames. In another embodiment, the frames 807 requested by the control frame 806 to be transmitted in response to receiving the control frame 807 are frames other than CTS frames. For example, the control frames 807 requested by the control frame 806 to be transmitted in response to receiving the control frame 806 are quality of service (QoS) frames that do now require to be acknowledged by AP 802, in an embodiment.

In an embodiment, each control frame 807 is a legacy control frame that at least substantially conforms to a legacy communication protocol (e.g., the IEEE 802.11a Standard, the IEEE 802.11n Standard, and/or the IEEE 802.11ac Standard). For example, each control frame 807 is a legacy PPDU that at least substantially conforms to PPDU format defined in the IEEE 802.11a Standard, in the IEEE 802.11n Standard, and/or in the IEEE 802.11ac Standard, in some embodiments. In an embodiment, the client stations 804 transmit the respective control frames 807 as parts of an OFDMA transmission 808 from the client stations 804 to the AP 802. The respective control frames 807 are transmitted in the respective sub-channels allocated to the client stations 804 for OFDMA communication during the TXOP 805, in an embodiment. In an embodiment, if a client station 804 is allocated a sub-channel that is greater than the smallest communication channel of the WLAN transmits a duplicate control frame 807 that duplicates the control frame 807 in each smallest WLAN channel within the sub-channel allocated to the client station 804. Thus, for example, the client station 804-3 transmits a control frame 807 in each 20 MHz channel of the 40 MHz sub-channel allocated to the client station 804-3, in the illustrated embodiment. Each control frame 807 includes an indication of a remaining duration of the TXOP 805 after the end of the control frame 807, in an embodiment. For example, each control frame 807 indicates a duration corresponding to transmission of the OFDMA data unit 809 from the AP 802 to the client stations 804 and transmission of the acknowledgement frames (e.g., ACK frames or BlkAck frames) 812 from the client stations 804 to the AP 802, in an embodiment.

In an embodiment, communication devices within the communication range of the client stations 804 determine TXOP duration based on the indication included in the control frame 807, and set their NAVs accordingly to refrain from transmission in the medium for the determined duration after the end of the control frame 807. For example, a communication device 832 within the communication range of the client station 804-3 sets its NAV according to the duration indicated by control frame 807 to refrain from transmission in the medium for the remaining duration of the TXOP 805 after the end of the control frame 807, in the illustrated embodiment. The AP 802 transmits the OFDMA data unit 809 to the client stations 804. The OFDMA data unit 809 includes respective OFDM data units 810 transmitted to the client stations 804 in respective sub-channels allocated to the client stations 804, in an embodiment. In response to receiving the respective OFDM data units 810, the client stations 804 transmit acknowledgement frames 812 to the AP 802 to acknowledge receipt of the data units 810. The acknowledgment frames 812 are transmitted by the client station 804 simultaneously, in the respective sub-channels allocated to the client stations 804 (i.e., the respective channels via which the client stations 804 received the respective data units 810), as parts of an OFDMA transmission from the client stations 804 to the AP 802, in an embodiment. Because communication devices in the communication range of the client stations 804 refrain from transmission in the medium for the duration indicated by the control frames 807, the reception of the OFDM data units 810 by the client stations 804 and transmission of acknowledgement frames 812 by the client stations 804 are protected from transmissions by the communication devices in the communication range of the client stations 804, in an embodiment.

Figure 8B:
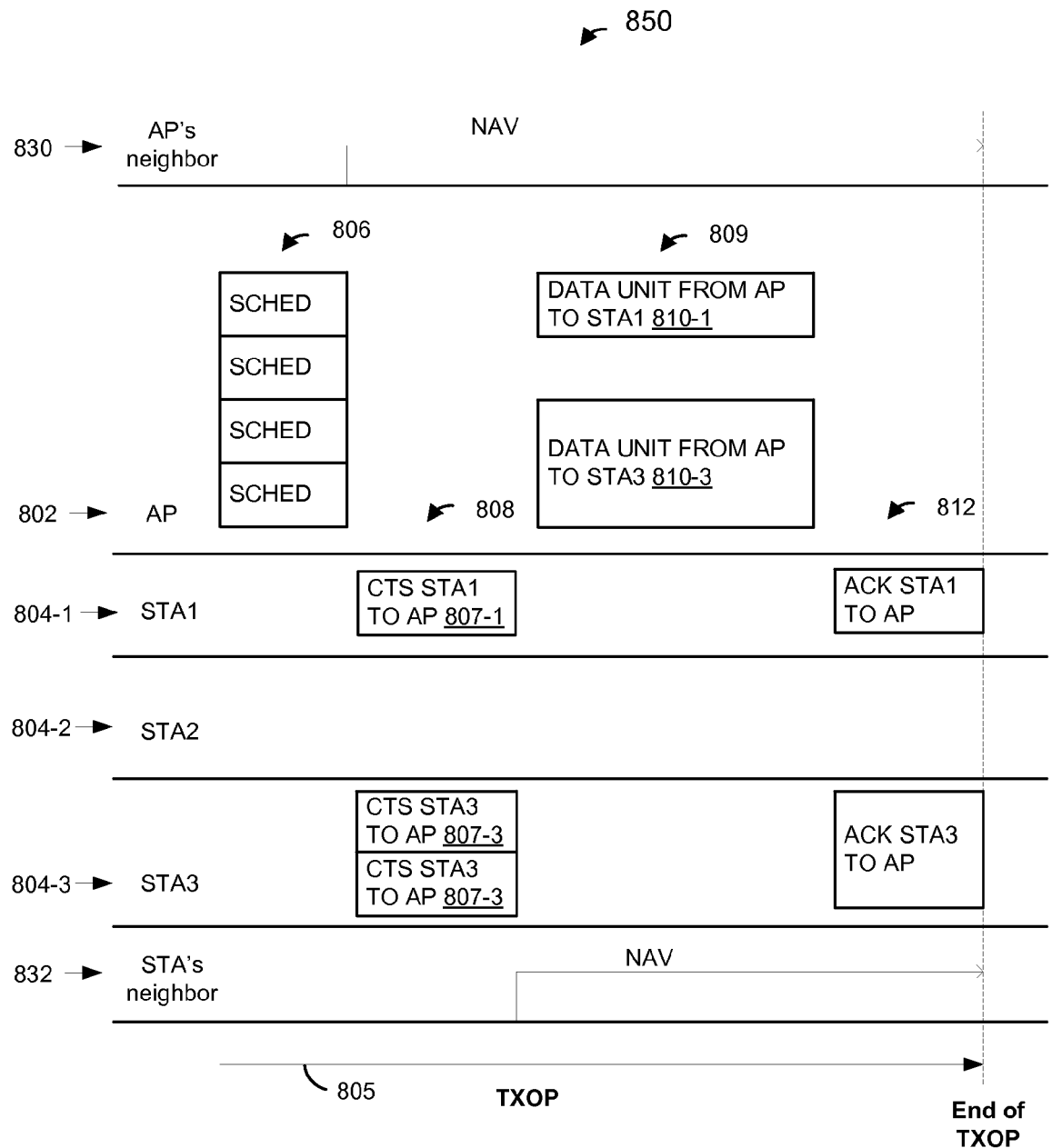
FIG. 8B is a diagram illustrating a frame exchange between an AP and a plurality of client stations, according to another embodiment.

FIG. 8B is diagram illustrating a frame exchange 850 between an AP and a plurality of client stations, according to an embodiment. The frame exchange 850 is generally the same as the frame exchange 800 of FIG. 8 except that in the frame exchange 850, not all of the client stations 804 transmit respective control frames 807 in response to receiving the control frame 806. For example, the client station 804-2 detects that the sub-channel allocated to the client station 806 is not available for transmission, in an embodiment. Accordingly, the client station 804-2 does not transmit the control frame 807 requested by the control frame 806 in response to receiving the control frame 806, in an embodiment. Because the AP 802 does not receive the control frame 807 from the client station 802, the AP 14 does not transmit an OFDM data unit directed to the client station 804-2 as part of the OFDMA transmission 809, in an embodiment.

Referring back to FIG. 1, in an embodiment and/or scenario, the AP 14 and the client stations 25 employ static bandwidth allocation for OFDMA transmission to and/or from client stations 25. In another embodiment and/or scenario, the AP 14 and one or more of the client stations 25 conduct dynamic bandwidth negation for OFDMA transmission to and/or from the one or more of the client stations 25. For example, when static bandwidth allocation is used for a client station 25, and only a portion of the allocated bandwidth is available for transmission to or from the client station 25, the transmission in the wider allocated bandwidth sub-channel to or from the client station 25 does not occur, in an embodiment. On the other hand, when dynamic bandwidth negotiation is used for a client station 25, and only a portion of the allocated bandwidth is available for transmission to or from the client station 25, transmission to or from the client station 25 can occur in a sub-channel corresponding the available bandwidth.

Figure 9A:
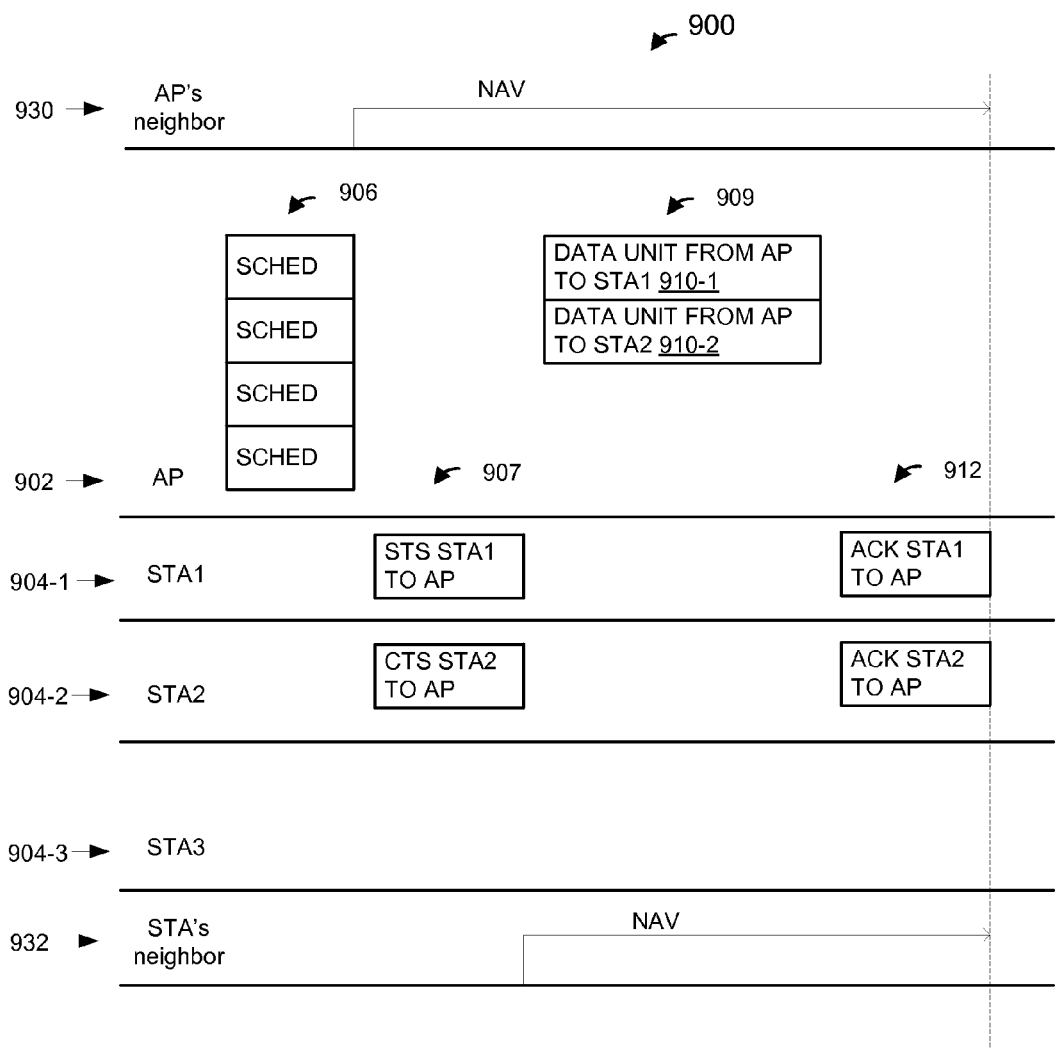
FIG. 9A is a diagram illustrating a frame exchange between an AP and a plurality of client stations, according to another embodiment.

FIG. 9A is diagram illustrating a frame exchange 900 between an AP and a plurality of client stations that employs static bandwidth allocation with the plurality of client stations, according to an embodiment. In particular, an AP 902 communicates with a plurality of client stations 904, including a first client station 904-1, a second client station 904-2 and a third client station 904-3, in the illustrated embodiment. With reference to FIG. 1, in an embodiment, the AP 902 corresponds to the AP 14 and the client stations 904 correspond to different ones of the client stations 25. In an embodiment, respective sub-channels are statically allocated to the plurality of client stations 904 for OFDMA communication with the plurality of the client stations 904. For example, respective 20 MHz sub-channels are allocated to each of the client stations 904-1 and 904-2, and a 40 MHz sub-channel is allocated to the client station 904-3, in the illustrated embodiment.

In an embodiment, the AP 902 transmits a control frame 906. The control frame 906 is generally similar to the control frame 806 of FIG. 8A. For example, the control frame 904 is a scheduling frame that identifies the client stations 904 and includes channel allocation information of OFDMA communication with the client stations 904, in an embodiment. In an embodiment, the control frame 906 further indicates that static bandwidth allocation is used for sub-channels allocated to the client stations 904. In an embodiment, the client station 904-3 detects that a first 20 MHz portion of the 40 MHz sub-channel allocated to the client station 904-3 is available to the client station 904-3, but a second 20 MHz portion of the 40 MHz sub-channel allocated to the client station 904-3 is not available to the client station 904-3. Because the control frame 906 indicated that static channel bandwidth allocation is used for the client station 904-3, the client station 904-3 does not transmit a control frame 907, even in the available 20 MHz portion of the 40 MHz sub-channel allocated to the client 904-3. Accordingly, the AP 902 does not transmit an OFDM data unit 910 to the client station 904-3 as a part of OFDMA transmission 909, in an embodiment.

Figure 9B:
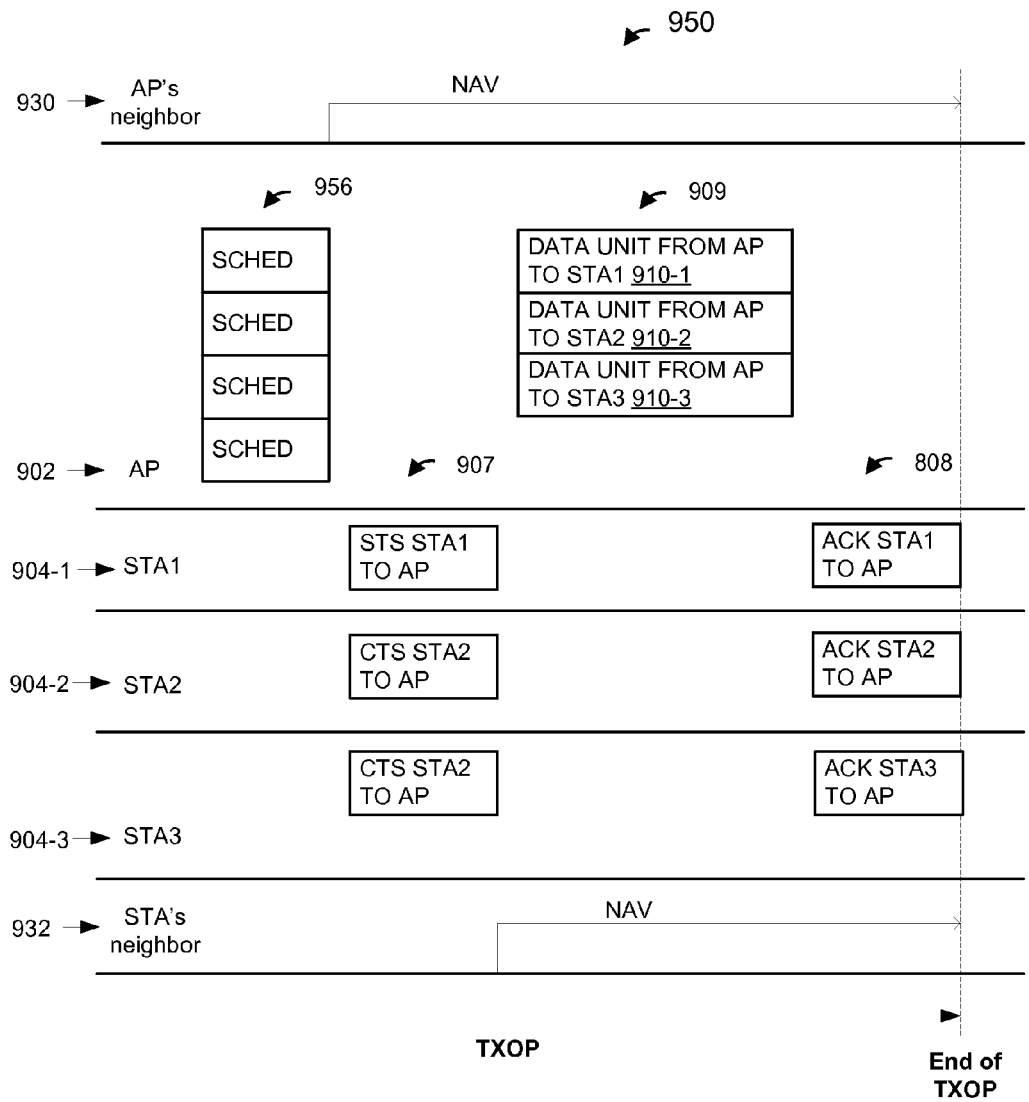
FIG. 9B is a diagram illustrating a frame exchange between an AP and a plurality of client stations, according to another embodiment.

FIG. 9B is diagram illustrating a frame exchange 950 between an AP 902 and a plurality of client stations 904, according to an embodiment. The frame exchange 950 is similar to the frame exchange 900 of FIG. 9A, except that in the frame exchange 950, a control frame 956 indicates that dynamic channel negotiation is used for sub-channels allocated to the client stations 904. Similar to the frame exchange 900, in the frame exchange 950, the client station 904-3 detects that a first 20 MHz portion of the 40 MHz sub-channel allocated to the client station 904-3 is available to the client station 904-3, but a second 20 MHz portion of the 40 MHz sub-channel allocated to the client station 904-3 is not available to the client station 904-3. Because the control frame 906 indicated that dynamic bandwidth negotiation is used for the client station 904-3, the client station 904-3 transmits transmit a control frame 907 in the available 20 MHz portion of the 40 MHz sub-channel allocated to the client 904-3. The AP 902 receives the control frame 907 transmitted in the available 20 MHz portion of the 40 MHz sub-channel allocated to the client station 904-3, and adjust the sub-channel allocated to the client station 904-3 to include only the available 20 MHz portion of the sub-channel. Accordingly, the AP 904 transmits a 20 MHz OFDM data unit 910-3 to the client station 904-3 as a part of OFDMA transmission 909, wherein the 20 MHz data unit 910-3 is transmitted in the 20 MHz portion available to the client station 904-3, in an embodiment. The client station 904-3 acknowledges receipt of the OFDM data unit 910-3 by transmitting an acknowledgement frame 912 in the 20 MHz portion available to the client station 904-3, in an embodiment.

Figure 10A:
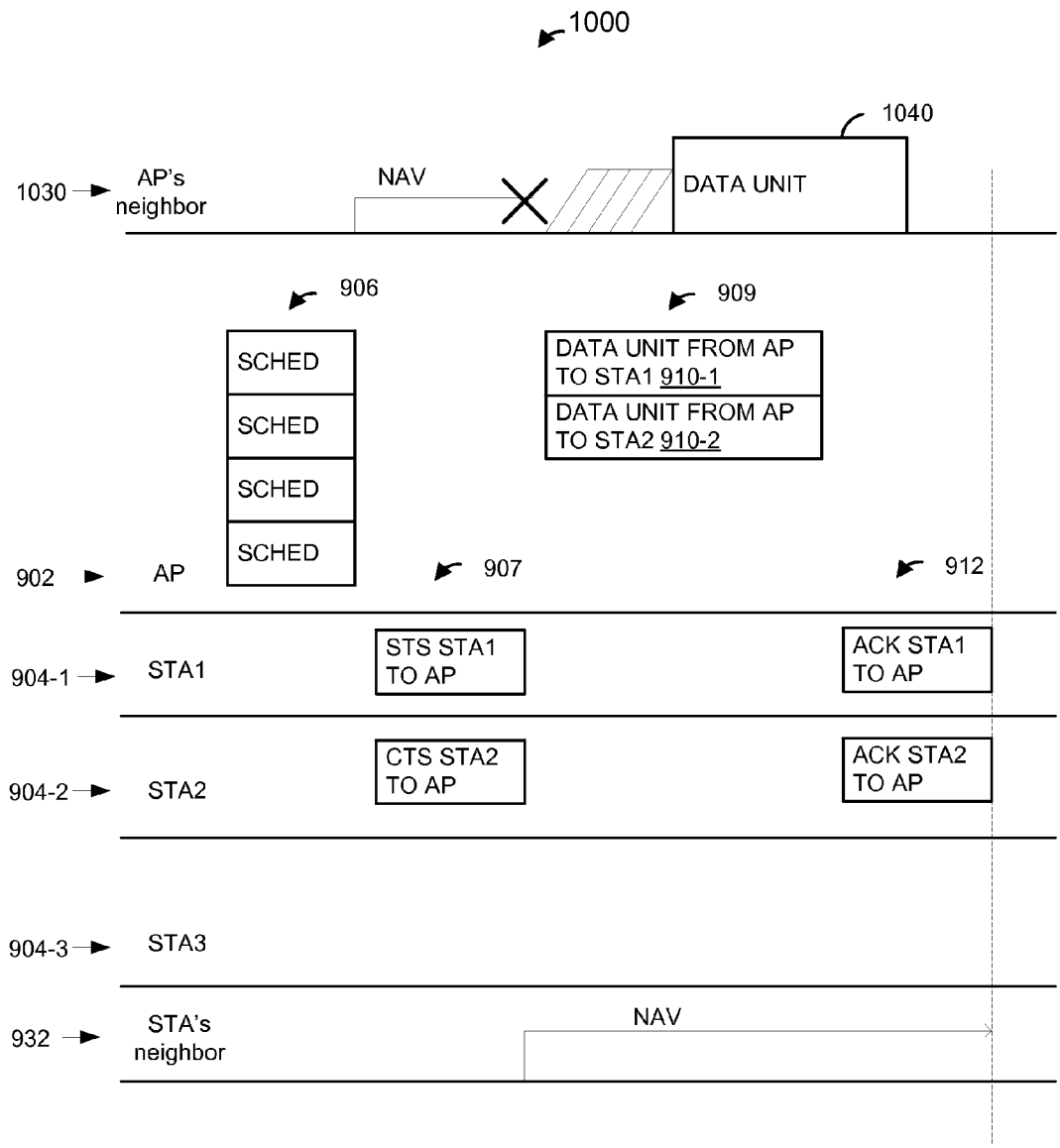
FIG. 10A is a diagram illustrating a frame exchange between an AP and a plurality of client stations, according to another embodiment.

FIG. 10A is diagram illustrating a frame exchange 1000 between an AP and a plurality of client stations, according to another embodiment. The frame exchange 1000 is generally the same as the frame exchange 900 of FIG. 9A, in an embodiment. Similar to the embodiment of FIG. 9A, in the embodiment of FIG. 10A, a communication device 1030 in the communication range of the AP 902 sets its NAV according to a duration indicated by the control frame 906. Unlike the communication device 930 of FIG. 9A, the communication device 1030, in response to not receiving a control frame 907 in the 40 MHz sub-channel allocated to the client station 904-3, resets its NAV and initiates a backoff period of a carrier sense multiple access with collision avoidance (CSMA/CA) procedure conducted in the 40 MHz sub-channel allocated to the client station 904-3, in an embodiment. If the communication device 1030 gains access to the medium according to the CSMA/CA procedure, then the communication device 1030 transmits a data unit 1040 in the 40 MHz channel allocated to the client station 904-3, in an embodiment. Transmission of the data unit 1040 in at least partially concurrent with transmission of the OFDMA data unit 909 transmitted by the AP 902 to the client stations 904-1 and 904-2 and/or at least partially concurrently with transmission of the acknowledgement frames 912 by the client stations 904-1 and 904-2, in an embodiment.

Figure 10B:
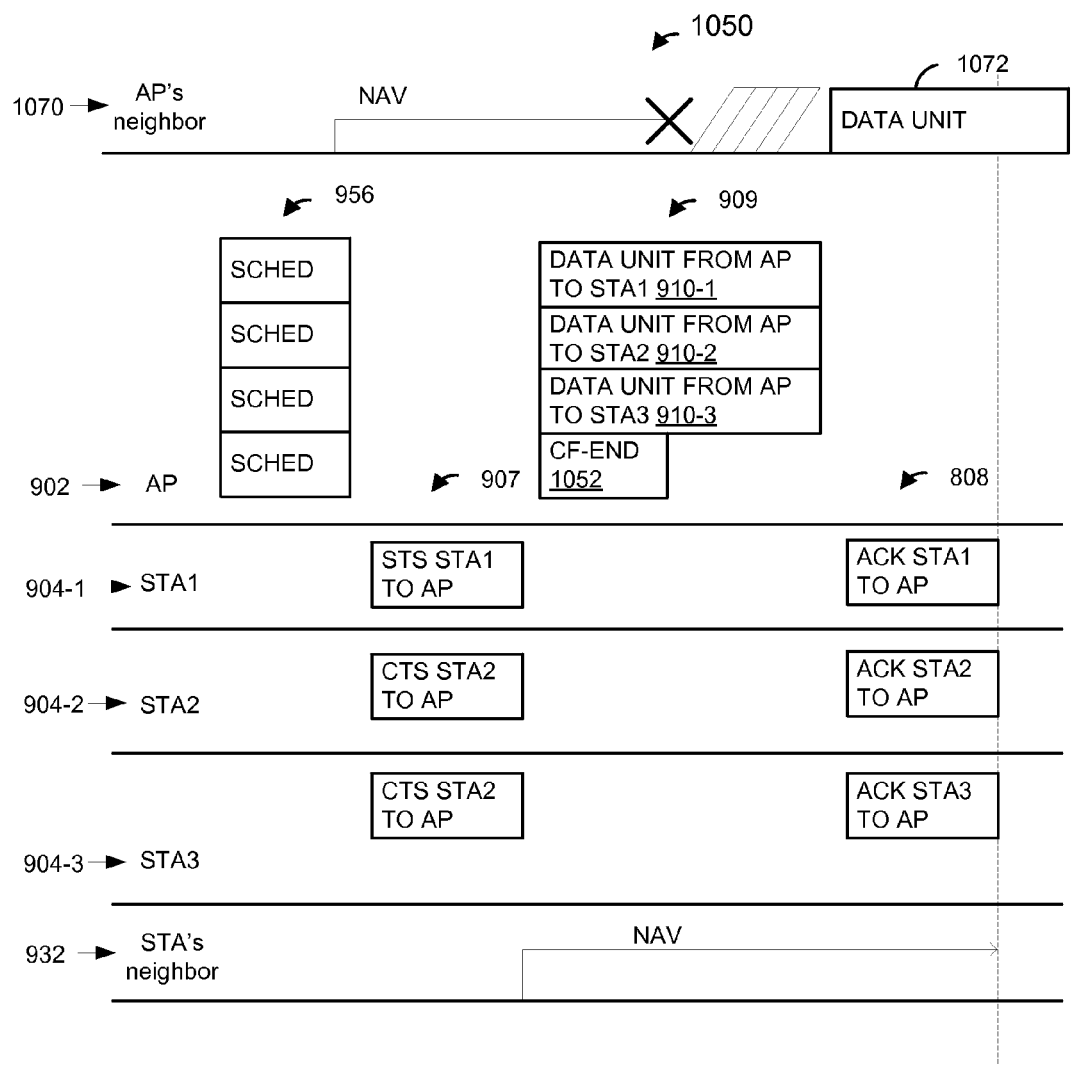
FIG. 10B is a diagram illustrating a frame exchange between an AP and a plurality of client stations, according to another embodiment.

FIG. 10B is diagram illustrating a frame exchange 1050 between an AP and a plurality of client stations that employs dynamic bandwidth negotiation with the plurality of client stations, according to another embodiment. The frame exchange 1050 is generally similar to the frame exchange 950 of FIG. 9B, in an embodiment. Similar to the embodiment of FIG. 9B, in the embodiment of FIG. 10B, a communication device 1030 in the communication range of the AP 902 sets its NAV according to a duration indicated by the control frame 906. Also similar to the frame exchange 950 of FIG. 9B, the client station 904-3 detects that only a 20 MHz portion of the 40 MHz sub-channel allocated to the client station 904-3 is available to the client station 904-3, and transmits a control frame 907 in the available 20 MHz portion of the 40 MHz sub-channel allocated to the client station 904-3. In response to receiving the control frame 907 in only a portion of the sub-channel allocated to the client station 904-1, the AP 902 adjusts the bandwidth allocated to the client station 904-3 to include only the available portion, and transmits the OFDM data unit 910-3, and part of the OFDMA transmission 909, in only the available portion of the 40 MHz sub-channel initially allocated to the client station 904-3. Additionally, the AP 902 includes, in the OFDMA data unit 909, a contention free end (CF-end) control frame 1052 transmitted in the 20 MHz portion of the 40 MHz-sub-channel allocated to the client station 904-3 that was detected to be unavailable to the client station 904-3.

With continued reference to FIG. 10B, similar to the communication device 903 of FIG. 9B, a communication device 1070 in the communication range of the AP 902 initially sets its NAV based on a duration indicated in the control frame 956. However, in the embodiment of FIG. 10B, in response to receiving the CF-end frame 1052, the communication device 1070 resets its NAV and initiates a backoff period of a carrier sense multiple access with collision avoidance (CSMA/CA) procedure conducted in the 20 MHz portion of the 40 MHz-sub-channel allocated to the client station 904-3 that was detected to be unavailable to the client station 904-3. If the communication device 1070 gains access to the medium according to the CSMA/CA procedure, then the communication device 1070 transmits a data unit 1072 in the 20 MHz portion of the 40 MHz-sub-channel allocated to the client station 904-3 that was detected to be unavailable to the client station 904-3, in an embodiment. Transmission of the data unit 1072 is at least partially concurrent with transmission of the OFDMA data unit 909 transmitted by the AP 902 to the client stations 904-1, 904-2 and 904-3 and/or at least partially concurrently with transmission of the acknowledgement frames 912 by the client stations 904-1, 904-2 and 904-3, in an embodiment.

Figure 11:
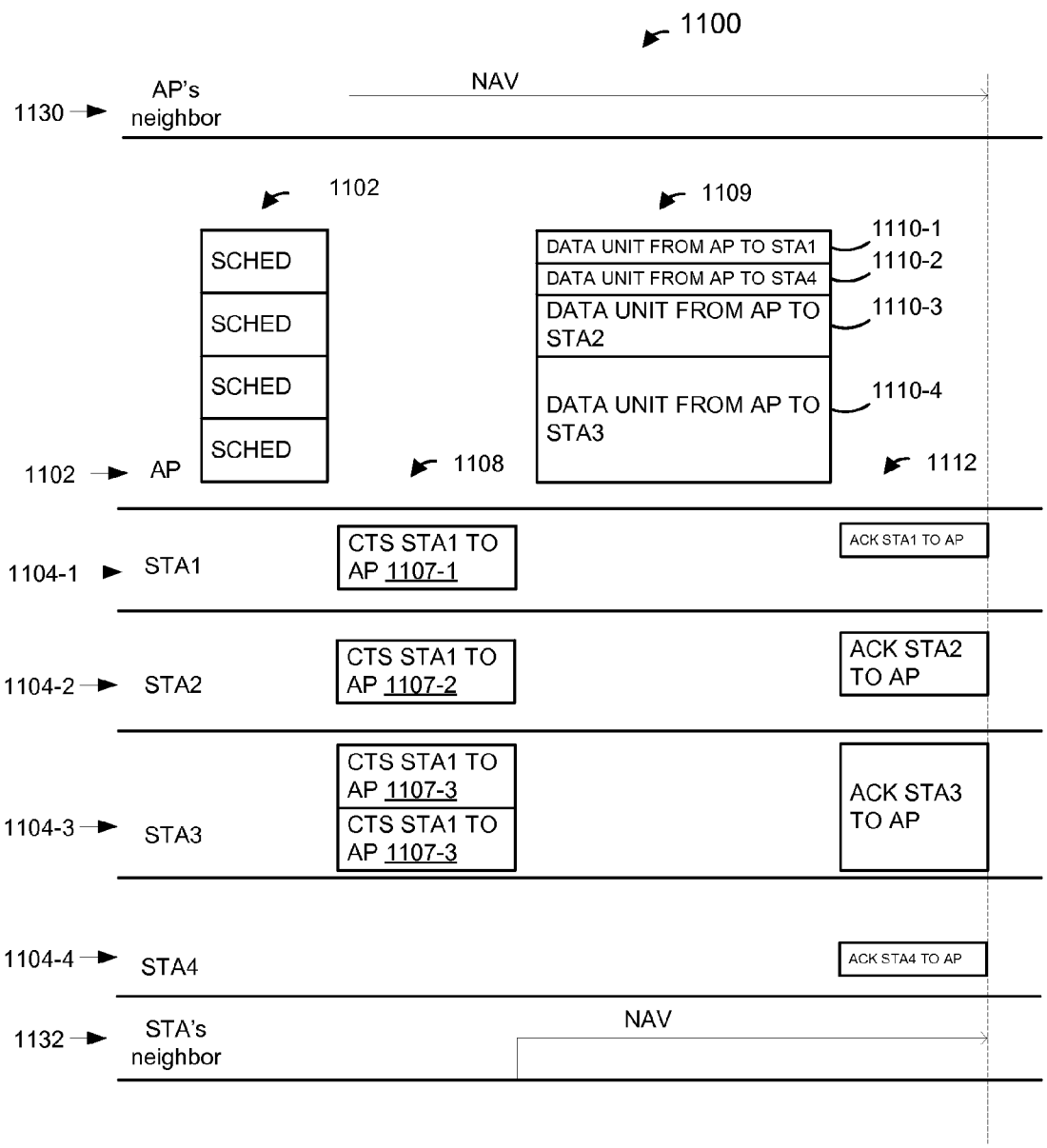
FIG. 11 is a diagram illustrating a frame exchange between an AP and a plurality of client stations, according to another embodiment.

FIG. 11 is diagram illustrating a frame exchange 1100 between an AP and a plurality of client stations, according to an embodiment. In particular, an AP 1102 utilizes OFDMA communication to communicate with a plurality of client stations 1104, including a first client station 1104-1, a second client station 1104-2, a third client station 1104-3, and a fourth client station 1104-4, in the illustrated embodiment. With reference to FIG. 1, in an embodiment, the AP 1102 corresponds to the AP 14 and the client stations 1104 correspond to different ones of the client stations 25. In an embodiment, respective sub-channels are allocated to the plurality of client stations 1104 for OFDMA communication with the plurality of the client stations 1104. In an embodiment the smallest channel of the WLAN in which the AP 1102 and the client stations 1104 operate is 20 MHz, and channel allocation for OFDMA communication includes at least some channels narrower than 20 MHz. For example, respective 10 MHz sub-channels are allocated to each of the client stations 1104-1 and 1104-4, a 20 MHz sub-channel is allocated to the client station 1104-2, and a 40 MHz sub-channel is allocated to the client station 1104-3, in the illustrated embodiment.

In an embodiment, the AP 1102 transmits a control frame 1106. The control frame 1106 is generally similar to the control frame 806 of FIG. 8A, in an embodiment. For example, the control frame 1106 is a scheduling frame that identifies the client stations 1104 and includes channel allocation information of OFDMA communication with the client stations 1104, in an embodiment. In an embodiment, the control frame 1106 further includes an indication requesting the identified client stations 1104 to transmit control frame 1107 in response to receiving the control frame 1106. Referring again to FIG. 8A, the control frames 1107 requested by the control frame 1106 are the same as or similar to the control frames 807 of FIG. 8A, in an embodiment. Similar to the embodiment of FIG. 8A, communication devices in the communication range of the AP 1102 set their NAVs based on duration indicated by the control frame 1106 and refrain from transmission for the duration indicated by the control frames 1106 (e.g., duration corresponding to transmission of control frames 1107 from client stations 1104 to the AP 1102, transmission of an OFDMA data unit 1109 from the AP 1102 to the client stations 1104, and transmission of acknowledgement frames 1112 from the client stations 1104 to the AP 1102), in an embodiment.

In an embodiment, when two of more client stations 1104 share a smallest channel bandwidth of the WLAN, the AP 1102 selects one of the two or more client stations 1104, and requests that the selected one of the two or more client station 1104 transit the control frame 1108. For example, the AP selects the one client station, of the two or more client stations 1104, which has the greatest number of neighboring communication devices in the communication range of the one client station, in an embodiment. In an embodiment, when a client station 1104 that is requested to transmit the control frame 1107 shares a smallest bandwidth channel of the WLAN with one or more client stations 1104, the client station 1104 transmits the control frame 1107 in the entire bandwidth shared with the client stations 1104.

For example, with respect to the client stations 1104-1 and 1104-4 that share a 20 MHz bandwidth channel, the AP 1102 selects the client station 1104-1, and signals in the control frame 802 that the client station 1104-1 is to transmit the control frame 1108, in the illustrated embodiment. In response to receiving the control frame 1106, the client stations 1104 that are requested to transmit control frames 1107 by the control frame 1106 transmit the control frames 1107. In an embodiment, each of the client stations 1104-2 and 1104-3 transmits its control frames 1107 in the respective sub-channels allocated to the client stations 1104-2, 1104-3, with the control frame 1107 transmitted by the client station 1104-3 being duplicated in each 20 MHz portion of the 40 MHz sub-channel allocated to the client station 1104-2. Additionally, the client station 1104-1 selected by the AP 1102 transmits its control frame 1107 in the 20 MHz shared by the client station 1104-1 and 1104-4, in an embodiment. The client stations 1104-1, 1104-2 and 1104-3 transit the control frames 1107 simultaneously as parts of an OFDMA transmission 1108 from the client stations 1104 to the AP 1102, in an embodiment.

In an embodiment, the client stations 1104-2 and 1104-3 transmit control frames 1107 in respective sub-channel allocated to the client stations 1104-2 and 1104-3. The client station 1104-1, selected by the AP 1102 to transmit the control frame 1107, transmits the control frame 1107 in the 20 MHz channel shared by the client station 1104-1 and client station 1104-4, in an embodiment. The control frame 1107 transmitted by the client station 1104-1 spans the 20 MHz bandwidth channel shared by the client station 1104-1 and client station 1104-4, in an embodiment. The client station 1104-4 refrains from transmitting a control frame 1107, in an embodiment.

Similar to the embodiment of FIG. 8A, communication devices in the communication range of the client stations 1104 that transmit the control frames 1107 set their NAVs based on duration indicated by the control frames 1107, and refrain from transmission for the duration indicated by the control frames 1107 (e.g., duration corresponding to transmission of the OFDMA data unit 1109 from the AP 1102 to the client stations 1104 and transmission of acknowledgement frames 1112 from the client stations 1104 to the AP 1102), in an embodiment. The AP 1102 transmits the OFDMA data unit 1109 to the client stations 1104. The OFDMA data unit 1109 includes respective OFDM data units 1110 transmitted to the client stations 1104 in respective sub-channels allocated to the client stations 1104, in an embodiment. In response to receiving the respective OFDM data units 1110, the client stations 1104 transmit acknowledgement frames 1112 to the AP 1102 to acknowledge receipt of the data units 1110. The acknowledgment frames 1112 are transmitted by the client station 1104 simultaneously, in the respective sub-channels allocated to the client stations 1104 (i.e., the respective channels via which the client stations 804 received the respective data units 810), as parts of an OFDMA transmission from the client stations 1104 to the AP 1102, in an embodiment. Because communication devices in the communication range of the client stations 1104 refrain from transmission in the medium for the duration indicated by the control frames 1107, the reception of the OFDM data units 1110 by the client stations 804 and transmission of acknowledgement frames 1112 by the client stations 1104 are protected from transmissions by the communication devices in the communication range of the client stations 1104, at least with respect to the client stations 1104-1, 1104-2 and 1104-3, in an embodiment.

Figure 12:
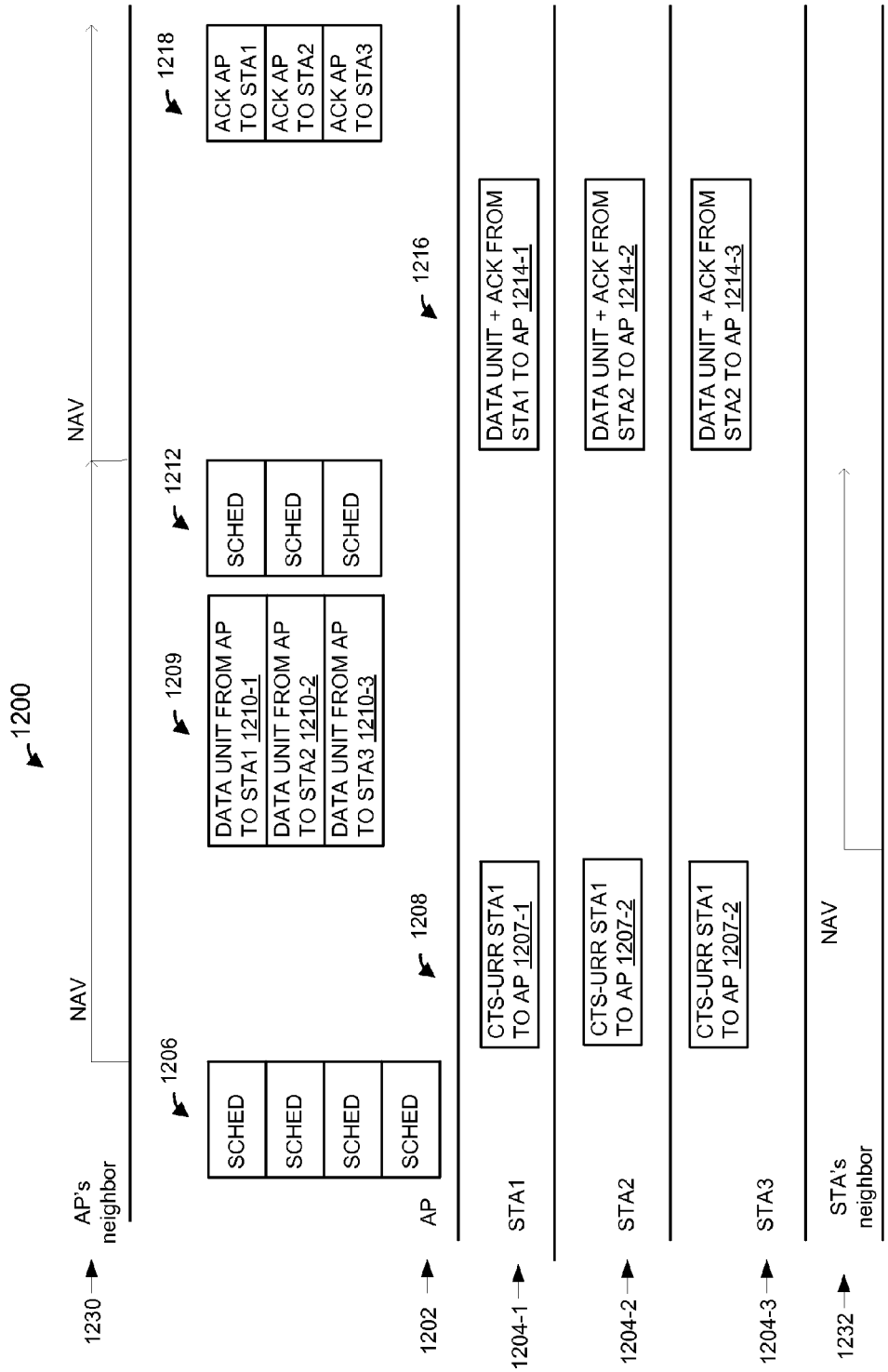
FIG. 12 is a diagram illustrating a frame exchange between an AP and a plurality of client stations, according to another embodiment.

FIG. 12 is diagram illustrating a frame exchange 1200 between an AP and a plurality of client stations, according to an embodiment. In particular, an AP 1202 utilizes OFDMA communication to communicate with a plurality of client stations 1204, including a first client station 1204-1, a second client station 1204-2, and a third client station 1204-3, in the illustrated embodiment. With reference to FIG. 1, in an embodiment, the AP 1202 corresponds to the AP 14 and the client stations 1204 correspond to different ones of the client stations 25.

The AP 1202 transmits a first control frame 1206 to the client stations 1204. With reference to FIG. 8A, the control frame 1206 is the same as or similar to the control frame 806. For example, the control frame 1206 is a scheduling frame that indicates respective sub-channels allocated to the client stations 1204 for OFDMA downlink transmission to the client stations 1204, in an embodiment. In an embodiment, in response to receiving the control frame 1206, the client stations 1204 transmit control frames 1207 to the AP 1202. In an embodiment, the control frames 1207 are similar to the control frames 807 of FIG. 8A, except that the control frames 1207 combine clear to send indication with uplink resource information, in an embodiment. For example, the control frames 1207 transmitted by the client stations 1207 include respective uplink resource indications indicating the amount of buffered data at the client stations 1207 and/or indications of requested medium time by the client stations 1207 for uplink transmission by the client stations 1207, a suitable length for an uplink OFDMA transmission from the client stations 1207 (e.g., uplink PPDU length), etc., in an embodiment. In an embodiment, the AP 1202 receives the respective uplink resource indications from the client stations 1204, and determines, based on the uplink resource indications, one or more parameters (e.g., sub-channel allocation, uplink PPDU length, etc.) based on the uplink resource indications received from the client stations 1204.

The AP 1202 transmits a downlink OFDMA data unit 1209 to the client stations 1204, in an embodiment. The downlink OFDMA data unit 1209 includes respective OFDM data units 1210 directed to the client stations 1204, the respective OFDM data unit transmitted in the respective sub-channels in which the AP 1202 received the control frames 1207 from the client stations 1204. After transmitting the OFDMA data unit 1209, the AP 1202 transmits a second control frame 1212 to the client statins 1204, in an embodiment. The second control frame 1212 is a scheduling frame that includes indications of one or more uplink transmission parameters determined by the AP 1202 based on the control frames 1207, in an embodiment.

The client stations 1204 receive the second control frame 1214 and transmit respective uplink OFDM data units 1214 to the AP 1202 using the uplink resource parameters provided by the second control frame 1212, in an embodiment. The client stations 1204 transmit the OFDM data units 1214 simultaneously, in respective sub-channels allocated to the client stations 1204, as parts of an OFDMA transmission 1216 to the AP 1202, in an embodiment. Upon receiving the OFDM data units 1214, the AP 1202 transmits acknowledgement frames 1218 to the client stations 1204 as parts of an OFDMA transmission to the client stations 1204, in an embodiment.

In an embodiment, the first scheduling frame 1206 includes an indication of a duration corresponding to transmission of the control frames 1207 from the client stations 1204 to the AP 1202, transmission of the OFDMA data unit 1212 from the AP 1202 to the client statins 1204 and transmission of the second control frame 1212 from the AP 1202 to the client stations 1202 after the end of the scheduling frame 1206. In another embodiment, the first scheduling frame 1206 includes an indication of a duration corresponding to transmission of the control frames 1207 (i.e., duration corresponding to transmission of the control frames 1207 the OFDMA transmission 1208) from the client stations 1204 to the AP 1202. In an embodiment, communication devices in the communication range of the AP 1202 use the duration indicated by the control frame 1206 to set their NAVs so as to refrain from transmission in the medium for the duration indicated by the control frame 1206. For example, a communication device 1230 in the communication range of the AP 1202 sets its NAV according to the duration indicated by control frame 1206 to refrain from transmission in the medium until the end of the second control frame 1212, in the illustrated embodiment. Thus, transmission of the control frames 1207 from the client stations 1204 to the AP 1202, transmission of the OFDMA data unit 1212 from the AP 1202 to the client statins 1204 and transmission of the second control frame 1212 from the AP 1202 to the client stations 1202 are protected from transmissions by the communication device 1230, in an embodiment.

The second control frame 1212 includes an indication of a duration corresponding to transmission of the OFDM data units 1214 from the client stations 1204 to the AP 1202, and transmission of the acknowledgement frames 1218 from the AP 1204 to the client stations 1204, in an embodiment. The communication devices in the communication range of the AP 1202 (e.g., the communication device 1230) reset their NAVs based on the duration indication in the second control frame 1212, in an embodiment. Thus, transmission of the OFDM data units 1214 from the client stations 1204 to the AP 1202, and transmission of the acknowledgement frames 1218 are protected from transmissions by the communication devices in the communication range of the AP 1202 (e.g., the communication device 1230), in an embodiment.

In an embodiment, each control frame 1207 includes an indication of a duration corresponding to transmission of the OFDMA data unit 109 and the second control frame 1212, in an embodiment. In an embodiment, communication devices in the communication range of the client stations 1204 use the duration indicated by the control frames 1207 to set their NAVs so as to refrain from transmission in the medium for the duration indicated by the control frames 1207. For example, a communication device 1232 in the communication range of a client station 1204 (e.g., the client station 1204-3) sets its NAV according to the duration indicated by control frame 1207 transmitted by the client station 1204, and refrains from transmission for the duration (i.e., until the end of the second control frame 1212, in the illustrated embodiment. Thus, transmission of the OFDMA data unit 109 and the second control frame 1212 are protected from transmissions by the communication device 1232, in an embodiment.

Figure 13A:
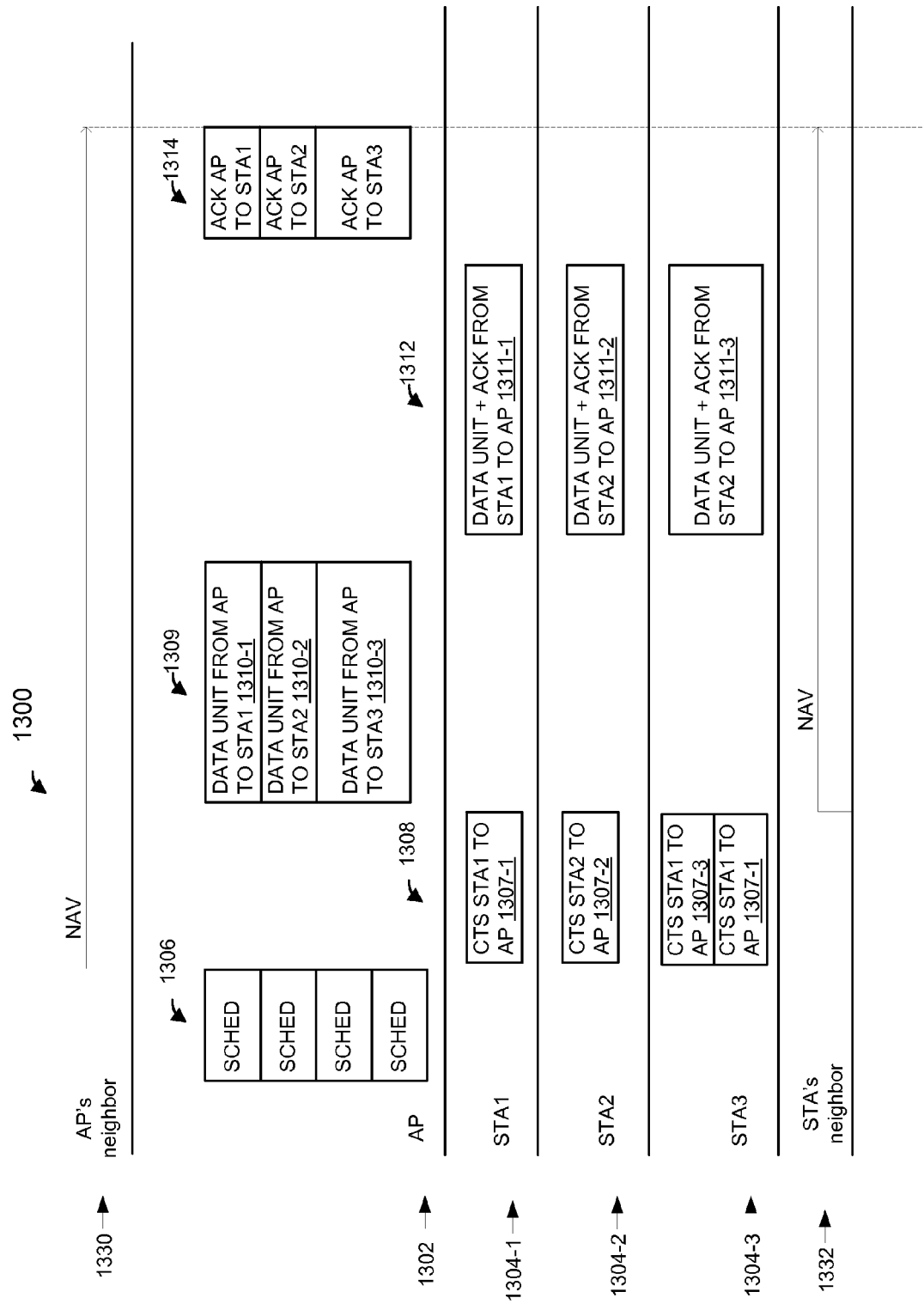
FIG. 13A is a diagram illustrating a frame exchange between an AP and a plurality of client stations, according to another embodiment.

FIG. 13A is a diagram illustrating a frame exchange 1300 between an AP and a plurality of client stations, according to an embodiment. In particular, an AP 1302 utilizes OFDMA communication to communicate with a plurality of client stations 1304, including a first client station 1304-1, a second client station 1304-2, and a third client station 1304-3, in the illustrated embodiment. With reference to FIG. 1, in an embodiment, the AP 1302 corresponds to the AP 14 and the client stations 1304 correspond to different ones of the client stations 25.

The frame exchange 1300 includes transmission of a downlink OFDMA data unit 1309 from the AP 1302 to the client stations 25, and transmission of an uplink OFDMA data unit from the client stations 1304 to the AP 1302, in an embodiment. The frame exchange 1300 begins with transmission of a control frame 1306 from the AP 1302 to the client stations 1304. With reference to FIG. 8A, the control frame 1306 is the same as or similar to the control frame 806. For example, the control frame 1306 is a scheduling frame that indicates respective sub-channels allocated to the client stations 1204 for OFDMA downlink transmission to the client stations 1204, in an embodiment. In an embodiment, the control frame 1206 also indicates respective sub-channels allocated to the client stations 1204 for OFDMA uplink transmission by the client stations 1204 and/or includes indications of one or more uplink transmission parameters (e.g., uplink PPDU length) for uplink transmission by the client stations 1304. In another embodiment, indications of sub-channel allocation for uplink transmission and/or indications of the one or more uplink transmission parameters are instead included in the OFDMA downlink data unit 1309. For example, a control frame that includes, indications of sub-channel allocation for uplink transmission and/or indications of the one or more uplink transmission parameters is prepended to or appended to OFDM data units 1310 transmitted to respective the client stations 1304, in an embodiment.

In an embodiment, in response to receiving the control frame 1306, the client stations 1304 transmit control frames, such as clear to send frames, 1307 as parts of an OFDMA transmission to the AP 1302. In another embodiment, transmission of the control frames 1307 is omitted from the frame exchange 1300. In yet another embodiment, transmission of the control frame 1306 and transmission of control frames 1307 are both omitted from the frame exchange 1300. After transmission of the OFDMA data unit 1309 from the AP 1302 to the client stations 1304, the client stations 1304 transmit respective OFDM data units 1311 to the AP 1302 as parts of an OFDMA transmission 1312 to the AP 1302. In an embodiment, the OFDM data units 1311 also include respective acknowledgements to acknowledge reception of the corresponding OFDM data units 1310 by the client stations 1304. For example, respective acknowledgement frames are appended (or prepended) to the corresponding OFDM data units 1311, in an embodiment. In an embodiment, in response to receiving the OFDMA transmission 1312 transmits respective acknowledgement frames 1314 to the client stations 1304 as parts of an OFDMA transmission to the client stations 1304.

In an embodiment, the control frame 1306 includes an indication of a duration corresponding to transmission of the control frames 1307 from the client stations 1304 to the AP 1302 (if the control frames 1307 are not omitted from the frame exchange 1300), transmission of the OFDMA data unit 1309 from the AP 1302 to the client statins 1304, transmission of OFDMA data unit 1312 from the client stations 1304 to the AP 1302, and transmission of the acknowledgement frames 1314 from the AP 1302 to the client stations 1304. In an embodiment, communication devices in the communication range of the AP 1302 use the duration indicated by the control frame 1306 to set their NAVs so as to refrain from transmission in the medium for the duration indicated by the control frame 1306. For example, a communication device 1330 in the communication range of the AP 1302 sets its NAV according to the duration indicated by control frame 1206 to refrain from transmission in the medium until the end of the acknowledgement frames 1314, in the illustrated embodiment. Thus, transmission of the control frames 1307 from the client stations 1304 to the AP 1302 (if the control frames 1307 are not omitted from the frame exchange 1300), transmission of the OFDMA data unit 1309 from the AP 1302 to the client statins 1304, transmission of OFDMA data unit 1312 from the client stations 1304 to the AP 1302, and transmission of the acknowledgement frames 1314 from the AP 1302 to the client stations 1304 are protected from transmissions by the communication device 1330, in an embodiment.

In an embodiment, each control frame 1307 includes an indication of a duration corresponding to transmission of the OFDMA data unit 1309 from the AP 1302 to the client statins 1304, transmission of OFDMA data unit 1312 from the client stations 1304 to the AP 1302, and transmission of the acknowledgement frames 1314 from the AP 1302 to the client stations 1304. In an embodiment, communication devices in the communication range of the client stations 1304 use the duration indicated by the control frames 1307 to set their NAVs so as to refrain from transmission in the medium for the duration indicated by the control frames 1307. For example, a communication device 1332 in the communication range of a client station 1304 (e.g., the client station 1304-3) sets its NAV according to the duration indicated by control frame 1307 transmitted by the client station 1304, and refrains from transmission for the duration (i.e., until the end of the acknowledgement frames 1314), in the illustrated embodiment. Thus, transmission of OFDMA data unit 1312 from the client stations 1304 to the AP 1302, and transmission of the acknowledgement frames 1314 from the AP 1302 to the client stations 1304 are protected from transmissions by the communication device 1332, in an embodiment.

Figure 13B:
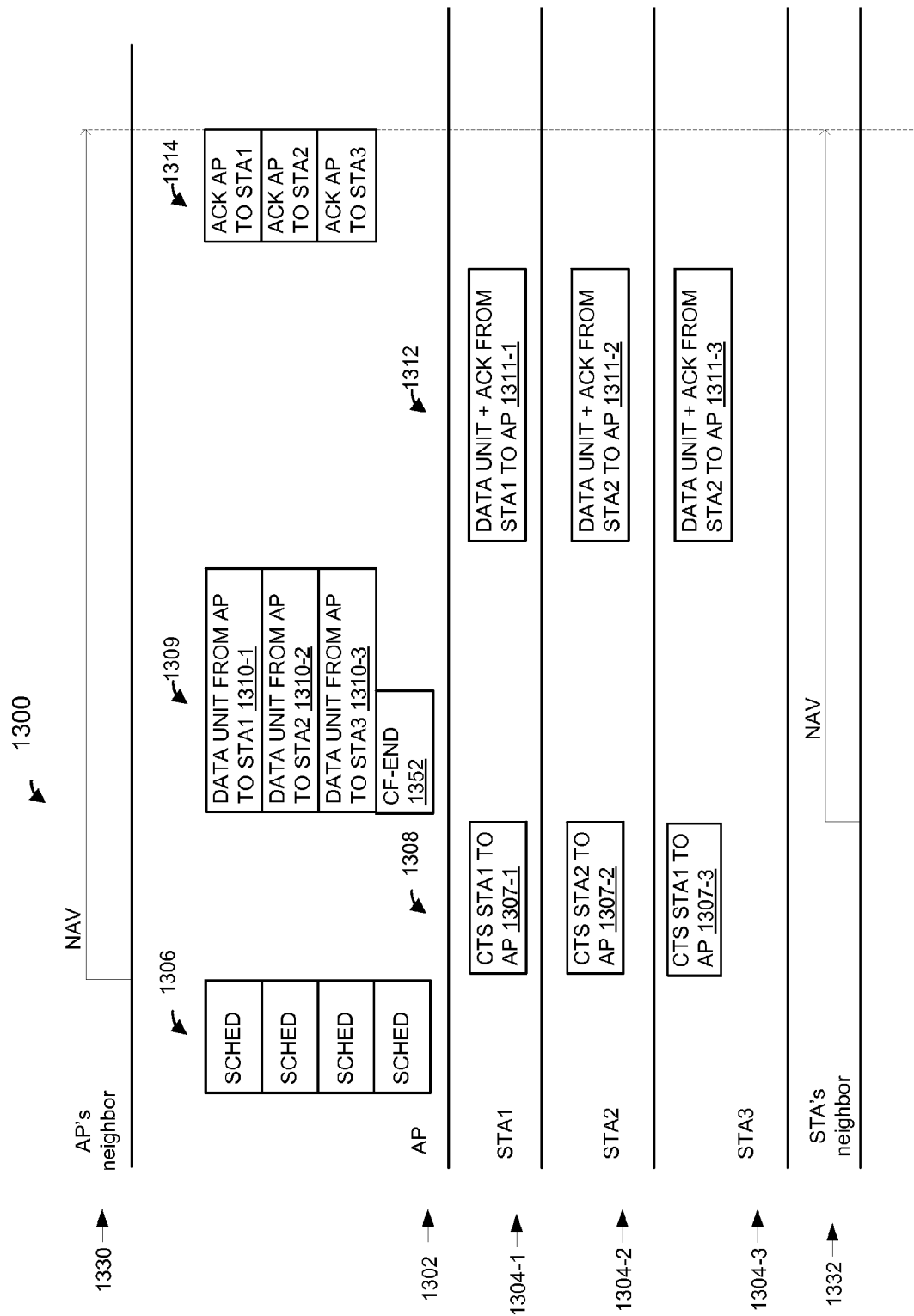
FIG. 13B is a diagram illustrating a frame exchange between an AP and a plurality of client stations, according to another embodiment.

FIG. 13B is diagram illustrating a frame exchange 1350 between an AP and a plurality of client stations, according to an embodiment. In particular, an AP 1302 utilizes OFDMA communication to communicate with a plurality of client stations 1304, including a first client station 1304-1, a second client station 1304-2, and a third client station 1304-3, in the illustrated embodiment. With reference to FIG. 1, in an embodiment, the AP 1302 corresponds to the AP 14 and the client stations 1304 correspond to different ones of the client stations 25.

The frame exchange 1350 is similar to the frame exchange 1300 of FIG. 13A except that in the frame exchange 1350, the AP 1302 and the client stations 1304 employ dynamic bandwidth negotiation, in an embodiment. For example, the client station 1304-3 detects that a first 20 MHz portion of the 40 MHz sub-channel allocated to the client station 1304-3 is available to the client station 1304-3, but a second 20 MHz portion of the 40 MHz sub-channel allocated to the client station 1304-3 is not available to the client station 1304-3. The client station 904-3 transmits a control frame 1307 in the available 20 MHz portion of the 40 MHz sub-channel allocated to the client station 1304-3. The AP 1302 receives the control frame 1307 transmitted in the available 20 MHz portion of the 40 MHz sub-channel allocated to the client station 1304-3, and adjust the sub-channel allocated to the client station 1304-3 to include only the available 20 MHz portion of the sub-channel. Accordingly, the AP 1302 transmits a 20 MHz OFDM data unit 1310-3 to the client station 1304-3 as a part of OFDMA data unit 1309, wherein the 20 MHz data unit 1310-3 is transmitted in the 20 MHz portion available to the client station 904-3, in an embodiment. Additionally, the AP 1302 includes, in the OFDMA data unit 1309, a contention free end (CF-end) control frame 1352 transmitted in the 20 MHz portion of the 40 MHz-sub-channel allocated to the client station 1304-3 that was detected to be unavailable to the client station 1304-3, in an embodiment. Transmission of the CF-end frame 1352 allows communication devices in the communication range of the AP 1302 to reset their NAVs with respect to the 20 MHz channel not used for transmission of data by the OFDMA data unit 1309, and to contend for use of the 20 MHz channel during transmission of the OFDMA data unit 1309.

FIGS. 14A-14C are diagrams illustrating a protection scheme 1400, according to an embodiment. In an embodiment, the protection scheme 1400 is used with OFDMA data units, such as the OFDMA data units described above with respect to FIGS. 2-13. In another embodiment, the protection scheme 1400 is used with a regular OFDM data unit that is transmitted to a client station, or to a group of client stations (e.g., a multiuser group of client stations), not as part of an OFDMA transmission. For example, the protection scheme 1400 is used with an OFDMA data unit that is transmitted to a client station, or is transmitted by a client station, using the entire bandwidth available for transmission to or by the client station, in an embodiment.

FIG. 14A is a diagram illustrating an example data unit 1402 that utilizes the protection scheme 1400, according to an embodiment. In an embodiment, the data unit 1402 corresponds to the OFDM data unit 200 of FIG. 2. In another embodiment, the data unit corresponds to the OFDMA data unit 500 of FIG. 5. In yet another embodiment, the data unit 1402 corresponds to one of the OFDMA data units 600 and 650 of FIGS. 6A and 6B, respectively. In another embodiment, the data unit 1402 is another suitable data unit.

The data unit 1402 includes a legacy preamble portion 1404 that, in turn, includes a legacy signal (L-SIG) field 1406. The data unit 1402 also includes a non-legacy signal field, such as an HEW-SIGB field 1408, and a data portion 1416. In an embodiment, the L-SIG field 1406 includes a set of one or more duration information bits 1410 the contents of which depend on protection mode being utilized for protecting transmission of at least the data unit 1402, as will be explained in more detail below. For example, the duration bits 1410 comprise a rate subfield of L-SIG 1406 and a length subfield of the L-SIG 1406 that together indicate a duration, wherein the indicated duration depends on the protection mode being utilized, in an embodiment. The HEW-SIGB field 1408 includes a protection mode sub-field 1412 and a data length sub-field 1414. In an embodiment, the protection mode sub-field 1412 includes one bit set to indicate whether a first mode of protection or a second mode of protection is utilized for protecting transmission of the data unit 1402. In another embodiment, the protection mode subfield 1412 includes a suitable number of bits other than one bit. In an embodiment, the first protection mode is a protection mode in which L-SIG field 1406 is used to protect transmission of at least one data unit or frame other than the data unit 1402, the at least one data unit or frame other than the data unit 1402 transmitted during the same TXOP or the same frame exchange as the data unit 1402. The second protection mode, on the other hand, is a protection mode in which L-SIG field 1406 is used to indicate a remaining length or duration of the data unit 1402 after the legacy preamble portion 1404, and is not used to protect transmission of a data unit or a frame other than the data unit 1402, in an embodiment.

In an embodiment, when the protection mode sub-field 1412 indicates that the first mode of protection is being utilized, the data length subfield 1414 is set to indicate a length of the data portion 1416 of the data unit 1402 (FIG. 14B). For example, the data length subfield 1414 is set to indicate a number of OFDM symbols included in the data portion 1416 or a number of bytes in the data portion 1416, in an embodiment. Further, when the protection mode sub-field 1412 indicates that the first mode of protection is being utilized, the duration information bits 1410 are set to indicate a remaining duration, after the legacy portion 1404 of the data unit 1402, of a frame exchange or a TXOP during which the data unit 1402 is transmitted, in an embodiment. For example, in an embodiment in which the duration information bits 1410 comprise a rate subfield and a length subfield, the rate subfield is set to indicate a rate (e.g., 6 mega-bits per second) defined by a legacy communication protocol and, and the length subfield is set to a value determined such that the rate and length together indicate the duration, in an embodiment. On the other hand, when the protection mode sub-field 1412 indicates that the second mode of protection is being utilized, the duration information bits 1410 are set to indicate a remaining duration of the data unit 1402 after the legacy portion 1404, in an embodiment. For example, in an embodiment in which the duration information bits 1410 comprise a rate subfield and a length subfield of the L-SIG field 1406, the rate subfield is set to indicate a rate (e.g., 6 mega-bits per second) defined by a legacy communication protocol and, and the length subfield is set to a value determined such that the rate and length together indicate the duration, in an embodiment. In an embodiment, the remaining duration of the data unit 1402 after the legacy portion 1404, indicated by the duration information bits 1410 of L-SIG field 1406, is indicative of the length of the data portion 1416 of the data unit 1402. In an embodiment, a receiving device that receives the data unit 1402 is able to determine the length of the data portion 1416 based on the duration indicated by the duration information bits 1410 of L-SIG field 1406 (FIG. 14C), in an embodiment, the data length subfield 1414 of the HEW-SIGB field is unused, or is used for a purpose other than indicating a data length, when the second mode of protection is being utilized, in an embodiment.

Figure 15:
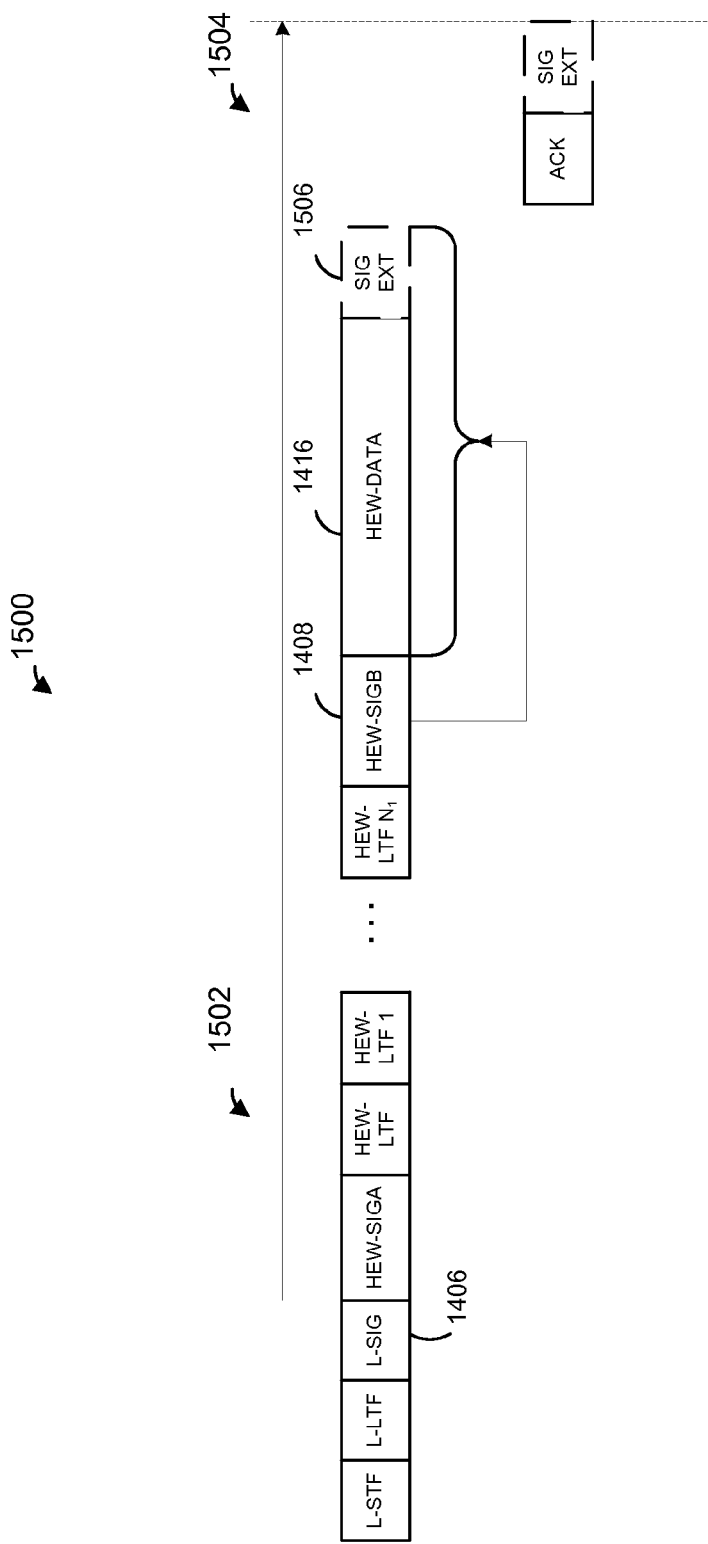
FIG. 15 is a diagram illustrating a frame exchange that utilizes the protection scheme of FIG. 14, according to an embodiment.

In an embodiment, a receiving device that receives the data unit 1402 determines, based on the protection mode 1412, whether the first mode of protection or the second mode of protection is utilized in the data unit 102, and interprets the information bits 1410 and the data length subfield 1414 according the first mode of protection of the second mode of protection accordingly. For example, when the receiving device determines that the first mode of protection is being utilized, the receiving device determines a length or duration of the data portion 1416 based on the data length subfield 1414 (FIG. 14B), in an embodiment. On the other hand, when the receiving device determines that the second mode of protection is being utilized, the receiving device determines a length or duration of the data portion 1416 based on the information bits 1410 (FIG. 14C), in an embodiment. FIG. 15 is a diagram illustrating a frame exchange 1500 that utilizes the protection scheme 1400 of FIG. 14, according to an embodiment. The frame exchange 1500 includes transmission of a data unit 1502 and transmission of an acknowledgement frame 1504 to acknowledge receipt of the data unit 1502. In an embodiment, the data unit 1502 corresponds to the data unit 1402 of FIG. 14. In an embodiment, the data unit 1502 includes at least the L-SIG field 1406, the HEW-SIGB field 1408 and the data portion 1416 of the data unit 1402 of FIG. 14. In some embodiments, the data unit 1502 includes a signal extension field 1504 appended to the data portion 1416. In other embodiments, the data unit 1502 omits the extension signal field 1506. When the signal extension field 1504 is included in the data unit 1502, the signal extension field 1504 is considered to be part of the data portion 1406 when indicating a length of the data portion 1406, in an embodiment. Further, in some embodiments, the data unit 1502 is a suitable data unit other than the data unit 1402 of FIG. 14.

In an embodiment, the data unit 1502 is an OFDM data unit transmitted by an AP (e.g., the AP 14 of FIG. 1) to a client station (e.g., the client station 25-1 of FIG. 1), and the acknowledgement frame 1504 is transmitted by the client station to the AP. In another embodiment, the data unit 1502 is an OFDM data unit transmitted by a client station (e.g., the client station 25-1 of FIG. 1) to an AP (e.g., the AP 14 of FIG. 1), and the acknowledgement frame 1504 is transmitted by the AP to the client station. In yet another embodiment, the data unit 1502 is an OFDMA data unit transmitted by an AP (e.g., the AP 14 of FIG. 1) to two or more client stations (e.g., two or more client stations 25 of FIG. 1), and the acknowledgement frame 1504 is an OFDMA data unit that includes respective acknowledgements transmitted by the two or more client stations to the AP. In still another embodiment, the data unit 1502 is an OFDMA data unit that includes respective OFDM data units by two or more client stations (e.g., two or more client stations 25 of FIG. 1) to an AP (e.g. the AP 14 of FIG. 1), and the acknowledgement frame 1504 is an OFDMA data unit that includes respective acknowledgements transmitted by the AP to the two or more client stations.

In the embodiment of FIG. 15, the data unit 1502 utilizes the first protection mode described above with respect to FIG. 14. In an embodiment, the HEW-SIGB field 1408 (e.g., the data length subfield 1414 of the HEW-SIGB field 1408) is used to indicate a length of the data portion 1416. In an embodiment, the HEW-SIGB field 1408 (e.g., the data length subfield 1414 of the HEW-SIGB field 1408) is used to indicate a length of the data portion 1416 and the extension signal field 1506 if the extension signal field 1506 is included in the data unit 1502. Further, the L-SIG field 1406 (e.g., the duration information bits 1410 of the L-SIG field 1406) indicates a remaining duration of the frame exchange 1500 after the legacy preamble portion 1404 of the data unit 1502, in the illustrated embodiment. Accordingly, the L-SIG field 1406 indicates a duration corresponding to transmission of the remainder of the data unit 1502 after the legacy preamble portion 1404, transmission of the acknowledgement frame 1504 and an interframe space between transmission of the data unit 1502 and transmission of the acknowledgement frame 1504, in an embodiment.

Figure 16:
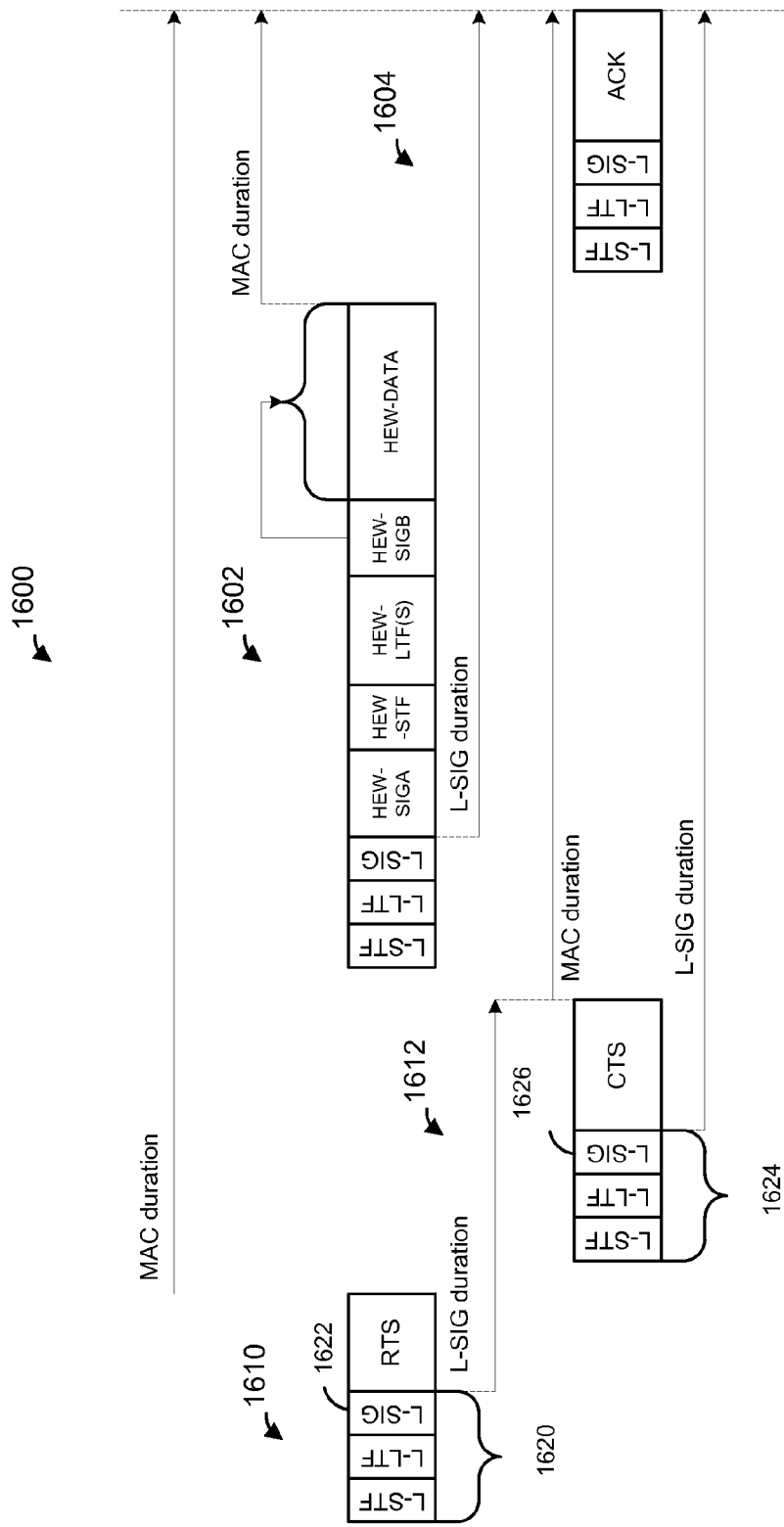
FIG. 16 is a diagram illustrating a frame exchange that utilizes the protection scheme of FIG. 14, according to another embodiment.

FIG. 16 is a diagram illustrating a frame exchange 1600 that utilizes the protection scheme 1400 of FIG. 14, according to another embodiment. The frame exchange 1600 includes transmission of a data unit 1602 and transmission of an acknowledgement frame 1604 to acknowledge receipt of the data unit 1602. For ease of explanation, the data unit 1602 is described below as being an OFDM data unit transmitted to one client station. However, the frame exchange 1602 can easily be extended to a scenario in which the data unit 1602 is an OFDMA data unit transmitted to a plurality of client station.

In the embodiment of FIG. 16, an AP (e.g., the AP 14 of FIG. 1) initiates the frame exchange 1600 by transmitting an RTS frame 1610 to a client station (the client station 25-1 of FIG. 1). In an embodiment, the client station receives the RTS frame 1610 and, in response to receiving the RTS frame 1610, transmits a CTS frame 1612 to the AP. In response to receiving the CTS frame 1612 from the client station, the AP transmits the data unit 1602 to the client station. In response to receiving the data unit 1602 for the AP, the client station transmits the acknowledgement frame 1604 to the AP. In an embodiment, transmission of the acknowledgement frame 1604 completes the frame exchange 1600.

In an embodiment, the RTS frame 1610 generally conforms to a control frame format (e.g., to RTS frame format) specified by a legacy communication protocol, such as the IEEE 802.11a Standard, the IEEE 802.11n Standard, and/or the IEEE 802.11ac Standard. The RTS frame 1610 includes a legacy preamble 1620 which, in turn, includes a legacy signal field (L-SIG) 1622. The L-SIG field 1622 includes a set of one or more duration information bits that indicate a duration corresponding transmission of the remainder RTS frame 1612 after the legacy preamble 1620, transmission of the CTS frame 1612 that follows transmission of the RTS frame 1610, and an interframe space between transmission of the RTS frame 1610 and transmission of the CTS frame 1612, in an embodiment. Communication devices that are in the communication range of the AP but are not intended recipients of the RTS frame 1610 set their respective NAVs based on the duration indicated by L-SIG field 1622 of the RTS frame 1610 so as to refrain from transmission in the medium for the duration indicated in the L-SIG field 1622, in an embodiment. Accordingly, transmission of the remainder of the RTS frame 1610 after the legacy preamble 1610 and transmission of the CTS frame 1612 that follows transmission of the RTS frame 1610 are protected from transmissions by the legacy communication devices.

The RTS frame 1610 also includes a MAC duration field in an MAC header of the RTS frame 1610, in an embodiment. In an embodiment, the MAC header duration is set to indicate a duration corresponding to the remainder of the frame exchange 1600 after the end of the RTS frame 1610. After receiving and decoding the MAC duration field of the RTS frame 1610, a communication device that (i) is in the communication range of the AP, (ii) is not an intended recipients of the RTS frame 1610 and (iii) is configured to decode and correctly interpret the MAC duration field of the RTS frame 1610 resets its NAV based on the duration indicated by the MAC duration field. Accordingly, the communication device refrains from transmitting in the medium for the duration of the frame exchange 1600, in this embodiment.

In an embodiment, the client station that is the intended recipient of the RTS frame 1610 receives the frame 1610 and, in response to receiving the RTS frame 1610 transmits the CTS frame 1612. In an embodiment, the CTS frame 1612 generally conforms to a control frame format (e.g., to CTS frame format) specified by a legacy communication protocol, such as the IEEE 802.11a Standard, the IEEE 802.11n Standard, and/or the IEEE 802.11ac Standard. The CTS frame 1612 includes a legacy preamble 1624 which, in turn, includes a legacy signal field (L-SIG) 1626. In an embodiment, the client station determines, based on the MAC duration field of the RTS frame 1610, the remaining duration of the frame exchange 1600 after RTS frame 1610. The client station also determines, based on the remaining duration of the frame exchange 1600 after RTS frame 1610, the remaining duration of the frame exchange 1600 after a legacy preamble 1614 of the CTS frame 1612, in an embodiment. In an embodiment, the client station sets a duration field of the L-SIG field 1626 of the CTS frame 1612 to indicate the remaining duration of the frame exchange 1600 after the legacy preamble 1624 of the CTS frame 1612, in an embodiment. In an embodiment, the client station sets a MAC duration field of the CTS frame 1614 to indicate the remaining duration of the frame exchange 1600 after the CTS frame 1600, in an embodiment.

In response to receiving the CTS frame 1612 from the client station, the AP transmits the data unit 1602 to the client station, in an embodiment. The client station receives the data unit 1602 and transmits the acknowledgement frame 1604 to acknowledge receipt of the data unit 1602, in an embodiment. In an embodiment, the data unit 1602 corresponds to the data unit 1502 of FIG. 15, and the acknowledgement frame 1604 corresponds to the acknowledgement frame 1504 of FIG. 15. The HEW-SIGB field of the data unit 1602 indicates a length of a data portion of the data unit 1602, in the illustrated embodiment. The L-SIG field of the data unit 1602 indicates a remaining duration of the frame exchange 1600 after the legacy preamble portion of the data unit 1602, in the illustrated embodiment. Further, a MAC duration field of the data unit 1602 indicates a remaining duration of the frame exchange 1600 after the data unit 1602, in an illustrated embodiment.

Figure 17:
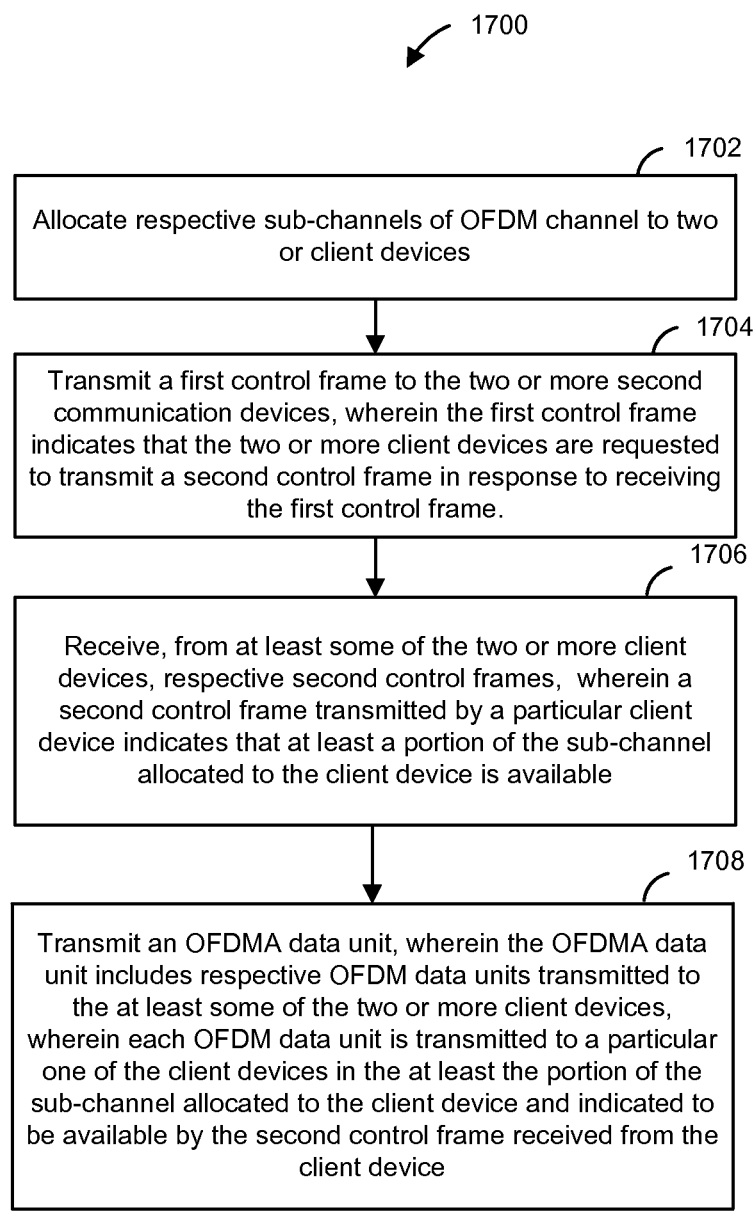
FIG. 17 is a flow diagram of an example method for simultaneous communication in a wireless local area network that includes a first communication device and multiple second communication devices, according to an embodiment.

FIG. 17 is a flow diagram of an example method 1700 for simultaneously communicating with multiple communication devices in a WLAN, according to an embodiment. In an embodiment, the method 1700 is implemented by an AP in the WLAN, according to an embodiment. With reference to FIG. 1, the method 1700 is implemented by the host processor 15 of the AP 14. For example, the method 1700 is implemented by the MAC processing unit 18 and/or by the PHY processing unit 20 of the host processor 15, in an embodiment. In other embodiments, the method 1700 is implemented by other components of the AP 14, or is implemented by a suitable communication device other than the AP 14.

At block 1702, respective sub-channels of an OFDM channel are allocated to two or more client devices. At block 1704, a first control frame is transmitted to the two or more client devices. In an embodiment, the first control frame indicates to the two or more client devices that the two or more client devices are requested to transmit a second control frame in response to receiving the first control frame. In an embodiment, the first control frame transmitted at block 1704 is a scheduling frame that includes indications of the respective sub-channels allocated to the two or more client devices. In other embodiments, the first control frame is a suitable control frame that does not include indications of the respective sub-channels allocated to the two or more client devices. For example, the first control frame is a request to send frame, in an embodiment.

At block 1706, respective second control frames are received from at least some of the two or more client devices. In an embodiment, the second control frames received at block 1706 are transmitted by the at least some of the two or client devices in the respective sub-channels allocated to the at least some of the two or more client devices. A particular control frame received at block 1706 from a particular client device indicates that at least a portion of the sub-channel allocated to the particular client device is available.

At block 1708, an OFDMA data unit is transmitted to the at least some of the two or more client devices. In an embodiment, the OFDMA data unit includes respective OFDM data units transmitted to the at least some of the two or more client devices. In an embodiment, each OFDM data unit is transmitted to a particular one of the client devices in the at least the portion of the sub-channel allocated to the client device and indicated to be available by the second control frame received from the client device.

FIG. 18 is a flow diagram of an example method 1800 for protection in a frame exchange between a first communication device and at least one second communication device, according to an embodiment. In an embodiment, the method 1800 is implemented by an AP in the WLAN, according to an embodiment. With reference to FIG. 1, the method 1800 is implemented by the host processor 15 of the AP 14. For example, the method 1800 is implemented by the MAC processing unit 18 and/or by the PHY processing unit 20 of the host processor 15, in an embodiment. In other embodiments, the method 1800 is implemented by other components of the AP 14, or is implemented by a suitable communication device other than the AP 14.

At block 1802, a first signal field of a data unit is generated. The first signal field indicates whether a first protection mode or a second protection mode is being used for protecting transmission of the data unit. In an embodiment, generating the first signal field at block 1802 includes block 1804, at which a data length subfield of the first signal field is set to indicate a length of a data portion of the data unit.

At block 1806, a second signal field to be included in a first preamble portion of the data unit is generated. In an embodiment, block 1806 includes one of blocks 1808 and 1810. Block 1808 is implemented when the first signal field indicates that the first protection mode is being used. At block 1808, the second signal field is generated to indicate a remaining duration of the frame exchange after the first preamble portion of the data unit. Block 1810 is implemented when the first signal field indicates that the second protection mode is being used. At block 1810, the second signal field is generated to indicate a duration indicative of the length of the data portion of the data unit. For example, the second field is generated at block 1810 to indicate a remaining duration of the data unit after the first preamble portion, wherein the remaining duration of the data unit after the first preamble portion is indicative of the length of the data portion of the data unit, in an embodiment.

At block 1812, the first preamble portion is generated to include at least the second signal field. At block 1814, the data unit is generated to include at least (i) the first preamble portion, (ii) the first signal field, and (iii) the data portion. At block 1816, the data unit is transmitted.

In an embodiment, a method for simultaneous communication in a wireless local area network that includes a first communication device and multiple second communication devices includes allocating, by the first communication device, respective sub-channels of an orthogonal frequency division multiplexing (OFDM) channel to two or more of the second communication devices. The method additionally includes transmitting a first control frame to the two or more second communication devices, wherein the first control frame indicates that the two or more second communication devices are requested to transmit a second control frame to the first communication device. The method further includes receiving, at the first communication device from at least some of the two or more second communication devices, respective second control frames, wherein the second control frames are transmitted by the at least some of the two or more second communication devices in the respective sub-channels allocated to the at least some of the two or more second communication devices, and wherein a second control frame transmitted by a particular second communication device indicates that at least a portion of the sub-channel allocated to the second communication device is available. The method further still includes transmitting an orthogonal frequency division multiple access (OFDMA) data unit, wherein the OFDMA data unit includes respective OFDM data units transmitted to the at least some of the two or more second communication devices, wherein each OFDM data unit is transmitted to a particular one of the second communication devices in the at least the portion of the sub-channel allocated to the second communication device and indicated to be available by the second control frame received from the second communication device.

In other embodiments, the method includes any suitable combination of one or more of the following features.

The method further includes providing, to the two or more second communication devices, indications of the respective sub-channels allocated to the two or more second communication devices.

Providing, to the two or more second communication devices, the indication of the respective sub-channels allocated to the two or more second communication devices comprises providing the indications prior to transmission of the first control frame to the two or more second communication devices.

The first control frame is a request to send (RTS) frame.

The second control frame is a clear to send (CTS) frame.

Providing, to the two or more second communication devices, the indication of the respective sub-channels allocated to the two or more second communication devices comprises including the indications in the first control frame transmitted to the two or more second communication devices.

The first control frame further indicates one of (i) that static bandwidth allocation is being utilized for transmission of the OFDMA data unit or (ii) that dynamic bandwidth negotiation is being utilized for transmission of the OFDMA data unit.

When the first control frame indicates that dynamic bandwidth is being utilized, the method further includes determining that only a portion of the sub-channel allocated to a particular second communication device in based on receiving the second control frame, from the particular second communication device, when the second control frame received from the second communication device occupies only the portion of the sub-channel allocated to the second communication device.

The method further includes, when it is determined that only the portion of the sub-channel allocated to the particular second communication device is available, including, in the OFDMA data unit (i) an OFDM data unit transmitted to the particular second communication device in only the available portion of the sub-channel allocated to the second communication device and (ii) a contention free end (CF-end) frame transmitted in an unavailable portion of the sub-channel allocated to the second communication device.

Allocating the respective sub-channels includes allocating, to two second communication devices two sub-channels having bandwidths less than a smallest bandwidth of the wireless local area network, such that the two second communication device share a channel having the smallest bandwidth of the wireless local area network.

The method further includes including, in the first control frame, an indication corresponding to one of the two second communication devices to indicate that the one of the two second communication device is requested to transmit the second control frame using the entire bandwidth of the channel shared by the two second communication devices.

In another embodiment, a first communication device comprises a network interface configured to allocate respective sub-channels of an orthogonal frequency division multiplexing (OFDM) channel to two or more second communication devices. The network interface is further configured to transmit a first control frame to the two or more second communication devices, wherein the first control frame indicates that the two or more second communication devices are requested to transmit a second control frame to the first communication device. The network interface is further still configured to receive, from at least some of the two or more second communication devices, respective second control frames, wherein the second control frames are transmitted by the at least some of the two or more second communication devices in the respective sub-channels allocated to the at least some of the second communication devices, and wherein a second control frame transmitted by a particular second communication device indicates that at least a portion of the sub-channel allocated to the second communication device is available. The network interface is additionally configured to transmit an orthogonal frequency division multiple access (OFDMA) data unit, wherein the OFDMA data unit includes respective OFDM data units transmitted to the at least some of the two or more second communication devices, wherein each OFDM data unit is transmitted to a particular one of the second communication devices in the at least the portion of the sub-channel allocated to the second communication device and indicated to be available by the second control frame received from the second communication device.

In other embodiments, the first communication device further includes any suitable combination of one or more of the following features.

The network interface is further configured to provide, to the two or more second communication devices, indications of the respective sub-channels allocated to the two or more second communication devices.

The network interface is configured to provide the indications of the respective sub-channels allocated to the two or more second communication devices prior to transmission of the first control frame to the two or more second communication devices.

The first control frame is a request to send (RTS) frame.

The second control frame is a clear to send (CTS) frame.

The network interface is configured to include the indications of the respective sub-channels allocated to the two or more second communication devices in the first control frame transmitted to the two or more second communication devices.

The network interface is further configured to include, in the first control frame, an indication to indicate one of (i) that static bandwidth allocation is being utilized for transmission of the OFDMA data unit or (ii) that dynamic bandwidth negotiation is being utilized for transmission of the OFDMA data unit.

The network interface is further configured to determine that only a portion of the sub-channel allocated to a particular second communication device in response to receiving the second control frame, from the particular second communication device when the second control frame received from the second communication device occupies only the portion of the sub-channel allocated to the second communication device.

The network interface is further configured to, when it is determined that only the portion of the sub-channel allocated to the particular second communication device is available, include, in the OFDMA data unit (i) an OFDM data unit transmitted to the particular second communication device in only the available portion of the sub-channel allocated to the second communication device and (ii) a contention free end (CF-end) frame transmitted in an unavailable portion of the sub-channel allocated to the second communication device.

The first communication device operates in a wireless local area network, and wherein the network interface is configured to allocate, to two respective second communication devices of the two or more second communication devices, two sub-channels having bandwidths less than a smallest bandwidth of the wireless local area network such that the two second communication device share a channel having the smallest bandwidth of the wireless local area network.

The network interface is further configured to include, in the first control frame, an indication corresponding to one of the two second communication devices to indicate that the one of the two second communication device is requested to transmit the second control frame using the entire bandwidth of the channel shared by the two second communication devices.

In yet another embodiment, a method for protection in a frame exchange between a first communication device and at least one second communication device includes generating, by a first communication device, a first signal field to be included in a data unit, wherein the first signal field indicates whether a first mode of protection or a second mode of protection is being used for protecting transmission of the data unit, including when the first signal field indicates that the first mode is being utilized, indicating, in a data length sub-field of the first signal field, a length of a data portion of the data unit. The method further includes generating, by the first communication device, a second signal field to be included in a first preamble portion of the data unit. When the first signal field indicates that the first mode of protection is being utilized, generating the second signal field includes indicating in the second signal field, a remaining duration of the frame exchange after the first preamble portion of the data unit. When the first signal field indicates that the second mode of protection is being utilized, generating the second signal field includes indicating, in the second signal field, a duration indicative of the length of the data portion of the data unit. The method further includes generating, by the first communication device, the first preamble portion to include at least the second signal field, generating, by the first communication device, the data unit to include at least (i) the first preamble portion, (ii) the first signal field, and (iii) the data portion, and transmitting the data unit from the first communication device to one or more second communication devices.

In other embodiments, the method includes any suitable combination of one or more of the following features.

Indicating the length of the data portion comprises indicating a number of orthogonal frequency division multiplexing (OFDM) symbols included in the data portion.

The first signal field is a non-legacy signal field that conforms to a non-legacy communication protocol, and the second signal field is a legacy signal field that conforms to a legacy communication protocol.

The data unit is an orthogonal frequency division multiplexing (OFDM) data unit transmitted to one or more second communication devices.

The data unit is an orthogonal frequency division multiple access (OFDMA) unit, wherein the OFDMA data unit includes respective orthogonal frequency division multiplexing (OFDM) data units transmitted to two or more second communication devices in respective sub-channels allocated to the two or more second communication devices.

In still another embodiment, a first communication device comprises a network interface configured to generate a first signal field to be included in a data unit, wherein the first signal field indicates whether a first mode of protection or a second mode of protection is being used for protecting transmission of the data unit, when the first signal field indicates that the first mode is being utilized, generating the first signal field includes indicating, in a data length sub-field of the first signal field, a length of a data portion of the data unit. The network interface is further configured to generate a second signal field to be included in a first preamble portion of the data unit. When the first signal field indicates that the first mode of protection is being utilized, generating the second signal field includes indicating in the second signal field, a remaining duration of the frame exchange after the first preamble portion of the data unit. When the first signal field indicates that the second mode of protection is being utilized, generating the second signal field includes indicating, in the second signal field, a duration indicative of the length of the data portion of the data unit. The network interface is further configured to generate the first preamble portion to include at least the second signal field, generate the data unit to include at least (i) the first preamble portion, (ii) the first signal field, and (iii) the data portion, and transmit the data unit to one or more second communication devices.

In other embodiments, the first communication device further includes any suitable combination of one or more of the following features.

The network interface is configured to indicate the length of the data portion at least by indicating a number of orthogonal frequency division multiplexing (OFDM) symbols included in the data portion.

The first signal field is a legacy signal field that conforms to a legacy communication protocol, and the second signal field is a non-legacy signal field that conforms to a non-legacy communication protocol.

The data unit is an orthogonal frequency division multiplexing (OFDM) data unit transmitted to one or more second communication devices.

The data unit is an orthogonal frequency division multiple access (OFDMA) unit, wherein the OFDMA data unit includes respective orthogonal frequency division multiplexing (OFDM) data units transmitted to two or more second communication devices in respective sub-channels allocated to the two or more second communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for simultaneous communication in a wireless local area network that includes a first communication device and multiple second communication devices, the method comprising:
    allocating, by the first communication device, respective sub-channels of an orthogonal frequency division multiplexing (OFDM) channel to two or more of the second communication devices;
    transmitting a first control frame to the two or more second communication devices, wherein the first control frame indicates that the two or more second communication devices are requested to transmit a second control frame to the first communication device;
    receiving, at the first communication device from at least some of the two or more second communication devices, respective second control frames, wherein the second control frames are transmitted by the at least some of the two or more second communication devices in the respective sub-channels allocated to the at least some of the two or more second communication devices, and wherein a second control frame transmitted by a particular second communication device indicates that at least a portion of the sub-channel allocated to the second communication device is available, and
    transmitting an orthogonal frequency division multiple access (OFDMA) data unit, wherein the OFDMA data unit includes respective OFDM data units transmitted to the at least some of the two or more second communication devices, wherein each OFDM data unit is transmitted to a particular one of the second communication devices in the at least the portion of the sub-channel allocated to the second communication device and indicated to be available by the second control frame received from the second communication device.

2. The method of claim 1, further comprising providing, to the two or more second communication devices, indications of the respective sub-channels allocated to the two or more second communication devices.

3. The method of claim 2, wherein providing, to the two or more second communication devices, the indication of the respective sub-channels allocated to the two or more second communication devices comprises providing the indications prior to transmission of the first control frame to the two or more second communication devices.

4. The method of claim 3, wherein:
    the first control frame is a request to send (RTS) frame, and
    the second control frame is a clear to send (CTS) frame.

5. The method of claim 2, wherein providing, to the two or more second communication devices, the indication of the respective sub-channels allocated to the two or more second communication devices comprises including the indications in the first control frame transmitted to the two or more second communication devices.

6. The method of claim 1, wherein the first control frame further indicates one of (i) that static bandwidth allocation is being utilized for transmission of the OFDMA data unit or (ii) that dynamic bandwidth negotiation is being utilized for transmission of the OFDMA data unit.

7. The method of claim 6, wherein when the first control frame indicates that dynamic bandwidth is being utilized, the method further comprises determining that only a portion of the sub-channel allocated to a particular second communication device in based on receiving the second control frame, from the particular second communication device, when the second control frame received from the second communication device occupies only the portion of the sub-channel allocated to the second communication device.

8. The method of claim 7, further comprising when it is determined that only the portion of the sub-channel allocated to the particular second communication device is available, including, in the OFDMA data unit
    (i) an OFDM data unit transmitted to the particular second communication device in only the available portion of the sub-channel allocated to the second communication device and
    (ii) a contention free end (CF-end) frame transmitted in an unavailable portion of the sub-channel allocated to the second communication device.

9. The method of claim 1, wherein allocating the respective sub-channels includes allocating, to two second communication devices two sub-channels having bandwidths less than a smallest bandwidth of the wireless local area network, such that the two second communication device share a channel having the smallest bandwidth of the wireless local area network.

10. The method of claim 9, further comprising including, in the first control frame, an indication corresponding to one of the two second communication devices to indicate that the one of the two second communication device is requested to transmit the second control frame using the entire bandwidth of the channel shared by the two second communication devices.

11. A first communication device, comprising:
    a network interface configured to
        allocate respective sub-channels of an orthogonal frequency division multiplexing (OFDM) channel to two or more second communication devices;
        transmit a first control frame to the two or more second communication devices, wherein the first control frame indicates that the two or more second communication devices are requested to transmit a second control frame to the first communication device;
        receive, from at least some of the two or more second communication devices, respective second control frames, wherein the second control frames are transmitted by the at least some of the two or more second communication devices in the respective sub-channels allocated to the at least some of the second communication devices, and wherein a second control frame transmitted by a particular second communication device indicates that at least a portion of the sub-channel allocated to the second communication device is available, and
        transmit an orthogonal frequency division multiple access (OFDMA) data unit, wherein the OFDMA data unit includes respective OFDM data units transmitted to the at least some of the two or more second communication devices, wherein each OFDM data unit is transmitted to a particular one of the second communication devices in the at least the portion of the sub-channel allocated to the second communication device and indicated to be available by the second control frame received from the second communication device.

12. The first communication device of claim 11, wherein the network interface is further configured to provide, to the two or more second communication devices, indications of the respective sub-channels allocated to the two or more second communication devices.

13. The first communication device of claim 12, wherein the network interface is configured to provide the indications of the respective sub-channels allocated to the two or more second communication devices prior to transmission of the first control frame to the two or more second communication devices.

14. The first communication device of claim 13, wherein:
the first control frame is a request to send (RTS) frame, and
the second control frame is a clear to send (CTS) frame.

15. The first communication device of claim 12, wherein the network interface is configured to include the indications of the respective sub-channels allocated to the two or more second communication devices in the first control frame transmitted to the two or more second communication devices.

16. The first communication device of claim 11, wherein the network interface is further configured to include, in the first control frame, an indication to indicate one of (i) that static bandwidth allocation is being utilized for transmission of the OFDMA data unit or (ii) that dynamic bandwidth negotiation is being utilized for transmission of the OFDMA data unit.

17. The first communication device of claim 16, wherein the network interface is further configured to determine that only a portion of the sub-channel allocated to a particular second communication device in response to receiving the second control frame, from the particular second communication device when the second control frame received from the second communication device occupies only the portion of the sub-channel allocated to the second communication device.

18. The first communication device of claim 17, wherein the network interface is further configured to, when it is determined that only the portion of the sub-channel allocated to the particular second communication device is available, include, in the OFDMA data unit
(i) an OFDM data unit transmitted to the particular second communication device in only the available portion of the sub-channel allocated to the second communication device and
(ii) a contention free end (CF-end) frame transmitted in an unavailable portion of the sub-channel allocated to the second communication device.

19. The first communication device of claim 11, wherein the first communication device operates in a wireless local area network, and wherein the network interface is configured to allocate, to two respective second communication devices of the two or more second communication devices, two sub-channels having bandwidths less than a smallest bandwidth of the wireless local area network such that the two second communication device share a channel having the smallest bandwidth of the wireless local area network.

20. The first communication device of claim 19, wherein the network interface is further configured to include, in the first control frame, an indication corresponding to one of the two second communication devices to indicate that the one of the two second communication device is requested to transmit the second control frame using the entire bandwidth of the channel shared by the two second communication devices.

21. A method for protection in a frame exchange between a first communication device and at least one second communication device, the method comprising:

generating, by a first communication device, a first signal field to be included in a data unit, wherein the first signal field indicates whether a first mode of protection or a second mode of protection is being used for protecting transmission of the data unit, including when the first signal field indicates that the first mode is being utilized, indicating, in a data length sub-field of the first signal field, a length of a data portion of the data unit;
generating, by the first communication device, a second signal field to be included in a first preamble portion of the data unit, including
when the first signal field indicates that the first mode of protection is being utilized, indicating in the second signal field, a remaining duration of the frame exchange after the first preamble portion of the data unit, and
when the first signal field indicates that the second mode of protection is being utilized, indicating, in the second signal field, the length of the data portion of the data unit;
generating, by the first communication device, the first preamble portion to include at least the second signal field;
generating, by the first communication device, the data unit to include at least (i) the first preamble portion, (ii) the first signal field, and (iii) the data portion; and
transmitting the data unit from the first communication device to one or more second communication devices.

22. The method of claim 21, wherein indicating the length of the data portion comprises indicating a number of orthogonal frequency division multiplexing (OFDM) symbols included in the data portion.

23. The method of claim 21, wherein the first signal field is a non-legacy signal field that conforms to a non-legacy communication protocol, and the second signal field is a legacy signal field that conforms to a legacy communication protocol.

24. The method of claim 21, wherein the data unit is an orthogonal frequency division multiplexing (OFDM) data unit transmitted to one or more second communication devices.

25. The method of claim 21, wherein the data unit is an orthogonal frequency division multiple access (OFDMA) unit, wherein the OFDMA data unit includes respective orthogonal frequency division multiplexing (OFDM) data units transmitted to two or more second communication devices in respective sub-channels allocated to the two or more second communication devices.

26. A first communication device, comprising:
a network interface configured to
generate a first signal field to be included in a data unit, wherein the first signal field indicates whether a first mode of protection or a second mode of protection is being used for protecting transmission of the data unit, and wherein when the first signal field indicates that the first mode is being utilized, generating the first signal field includes indicating, in a data length sub-field of the first signal field, a length of a data portion of the data unit;
generate a second signal field to be included in a first preamble portion of the data unit, including
when the first signal field indicates that the first mode of protection is being utilized, generating the second signal field includes indicating in the second signal field, a remaining duration of the frame exchange after the first preamble portion of the data unit, and when the first signal field indicates that the second mode of protection is being utilized, generating the second signal field includes indicating, in the second signal field, a duration indicative of the length of the data portion of the data unit;

generate the first preamble portion to include at least the second signal field;

generate the data unit to include at least (i) the first preamble portion, (ii) the first signal field, and (iii) the data portion; and transmit the data unit to one or more second communication devices.

27. The first communication device of claim 26, wherein the network interface is configured to indicate the length of the data portion at least by indicating a number of orthogonal frequency division multiplexing (OFDM) symbols included in the data portion.

28. The first communication device of claim 26, wherein the first signal field is a legacy signal field that conforms to a legacy communication protocol, and the second signal field is a non-legacy signal field that conforms to a non-legacy communication protocol.

29. The first communication device of claim 26, wherein the data unit is an orthogonal frequency division multiplexing (OFDM) data unit transmitted to one or more second communication devices.

30. The first communication device of claim 26, wherein the data unit is an orthogonal frequency division multiple access (OFDMA) unit, wherein the OFDMA data unit includes respective orthogonal frequency division multiplexing (OFDM) data units transmitted to two or more second communication devices in respective sub-channels allocated to the two or more second communication devices.

* * * * *